(12) United States Patent
Zohni

(10) Patent No.: US 12,112,440 B2
(45) Date of Patent: Oct. 8, 2024

(54) MIXED-REALITY VISOR FOR IN-SITU VEHICULAR OPERATIONS TRAINING

(71) Applicant: Wael Zohni, Henderson, NV (US)

(72) Inventor: Wael Zohni, Henderson, NV (US)

( * ) Notice: Subject to any disclaimer, the term of this patent is extended or adjusted under 35 U.S.C. 154(b) by 0 days.

(21) Appl. No.: 17/919,304

(22) PCT Filed: Dec. 17, 2021

(86) PCT No.: PCT/US2021/064043
§ 371 (c)(1),
(2) Date: Oct. 17, 2022

(87) PCT Pub. No.: WO2022/133219
PCT Pub. Date: Jun. 23, 2022

(65) Prior Publication Data
US 2023/0334788 A1 Oct. 19, 2023

Related U.S. Application Data

(60) Provisional application No. 63/190,138, filed on May 18, 2021, provisional application No. 63/180,040, (Continued)

(51) Int. Cl.
| | |
|---|---|
| *G06T 19/00* | (2011.01) |
| *G01S 17/89* | (2020.01) |
| *G02B 27/01* | (2006.01) |
| *G06F 3/01* | (2006.01) |
| *G06T 15/00* | (2011.01) |

(52) U.S. Cl.
CPC ............ *G06T 19/006* (2013.01); *G01S 17/89* (2013.01); *G02B 27/0172* (2013.01); *G06F 3/012* (2013.01); *G06F 3/015* (2013.01); *G06T 15/00* (2013.01); *G02B 2027/0187* (2013.01)

(58) Field of Classification Search
None
See application file for complete search history.

(56) References Cited

U.S. PATENT DOCUMENTS

| | | |
|---|---|---|
| 8,411,214 B2 | 4/2013 | Chapman et al. |
| 9,097,891 B2 | 8/2015 | Border et al. |

(Continued)

OTHER PUBLICATIONS

International Preliminary Report on Patentability, corresponding to PCT Application No. PCT/US2021/064043, dated Jun. 29, 2023.

(Continued)

*Primary Examiner* — Ryan M Gray
(74) *Attorney, Agent, or Firm* — Harness, Dickey & Pierce, P.L.C.

(57) ABSTRACT

A Mixed-Reality visor (MR-visor) system and method utilizing environmental sensor feedback for replicating restricted external visibility during operation of manned vehicles, such as marine or aircraft. Adaptive hardware and software enable the user to reliably limit, modify and/or block views outside window(s) areas of the vehicle while maintaining visibility of the cabin interior and instrument control panel(s) without need for complex mechanical hardware alignment and setup. In the case of aircraft pilot training, the MR-visor can be worn by a pilot to replicate Instrument Meteorological Conditions (IMC) and other challenging scenarios.

58 Claims, 21 Drawing Sheets

Related U.S. Application Data filed on Apr. 26, 2021, provisional application No. 63/128,163, filed on Dec. 20, 2020.

(56) References Cited

U.S. PATENT DOCUMENTS

| | | | |
|---|---|---|---|
| 9,454,022 | B1 | 9/2016 | Sinopoli |
| 9,759,917 | B2 | 9/2017 | Osterhout et al. |
| 9,995,936 | B1* | 6/2018 | Macannuco ............ G06F 3/011 |
| 10,180,572 | B2 | 1/2019 | Osterhout et al. |
| 10,249,208 | B2 | 4/2019 | Lavallee et al. |
| 10,345,593 | B2 | 7/2019 | Samec et al. |
| 10,359,631 | B2 | 7/2019 | Samec et al. |
| 10,529,248 | B2 | 1/2020 | Chavez et al. |
| 10,539,787 | B2* | 1/2020 | Haddick ............... G06F 3/0428 |
| 10,575,920 | B2 | 3/2020 | Kim et al. |
| 2010/0001928 | A1 | 1/2010 | Nutaro |
| 2012/0206452 | A1* | 8/2012 | Geisner .................. G06F 3/013 |
| | | | 345/419 |
| 2016/0026242 | A1 | 1/2016 | Burns et al. |
| 2017/0357332 | A1* | 12/2017 | Balan ..................... G06F 3/017 |
| 2019/0012928 | A1* | 1/2019 | Lavallee ............... G01C 23/005 |
| 2019/0324274 | A1 | 10/2019 | Kalinowski et al. |
| 2020/0192089 | A1 | 6/2020 | Haddick et al. |
| 2021/0049925 | A1 | 2/2021 | Robinson et al. |
| 2021/0295732 | A1* | 9/2021 | Rosolio .................... G09B 9/30 |

OTHER PUBLICATIONS

C. Debeunne and D. Vivet. "A Review of Visual-LiDAR Fusion based Simultaneous Localization and Mapping," Sensors 2020, 20, 2068; doi: 10.3390/s20072068, Accepted: Apr. 5, 2020; Published: Apr. 7, 2020.

G. Klein and D. Murray, "Parallel Tracking and Mapping for Small AR Workspaces," 2007 6th IEEE and ACM International Symposium on Mixed and Augmented Reality, Nara, Nov. 13-16, 2007, pp. 225-234, doi: 10.1109/ISMAR.2007.4538852.

G. Klein and D. Murray, "Parallel Tracking and Mapping on a camera phone," 2009 8th IEEE International Symposium on Mixed and Augmented Reality, Washington DC, Oct. 19-22, 2009, pp. 83-86, doi: 10.1109/ISMAR.2009.5336495.

J. Carreria and C. Sminchisescu, "CPMC: Automatic Object Segmentation Using Constrained Parametric Min- Cuts," IEEE Transactions on Pattern Analysis and Machine Intelligence, vol. 34, No. 7, pp. 1312-1328, Jul. 1, 2012, doi: 10.1109/TPAMI.2011.231.

He, K., Gkioxari, G., Dollar, P. and Girshick, R., "Mask R-CNN," 2017 IEEE International Conference on Computer Vision (ICCV), Venice, Oct. 22-29, 2017, pp. 2980-2988, doi: 10.1109/ICCV.2017. 322.

C. Campos, R. Elvira, J. Gomez Rodrigues, J. Montiel, J. Tordos, "ORB-SLAM3: An Accurate Open-Source Library for Visual, Visual-Inertial and Multi-Map Slam", IEEE Transactions and Robotics, Apr. 23, 2021.

R. Mur-Artal and J. D. Tardos, "Visual-Inertial Monocular Slam With Map Reuse," in IEEE Robotics and Automation Letters, vol. 2, No. 2, pp. 796-803, Oct. 19, 2016, doi: 10.1109/LRA.2017. 2653359.

P. Furgale, J. Rehder, and R. Siegwart, "Unified Temporal and Spatial Calibration for Multi-Sensor Systems." In Proceedings of the IEEE/RSJ International Conference on Intelligent Robots and Systems (IROS), Tokyo, Japan, Nov. 1, 2013.

TDK InvenSense, "SmartMotion", Online, https://invensense.tdk. com/smartmotion/.

David Tulis, "IMC on a VFR Day: ICARUS Face Shield Simulates Realistic Conditions: View Limiting Device Controlled by App" AOPA, Sep. 20, 2021.

International Search Report and Written Opinion regarding International Application No. PCT/US2021/64043, dated Mar. 8, 2022.

* cited by examiner

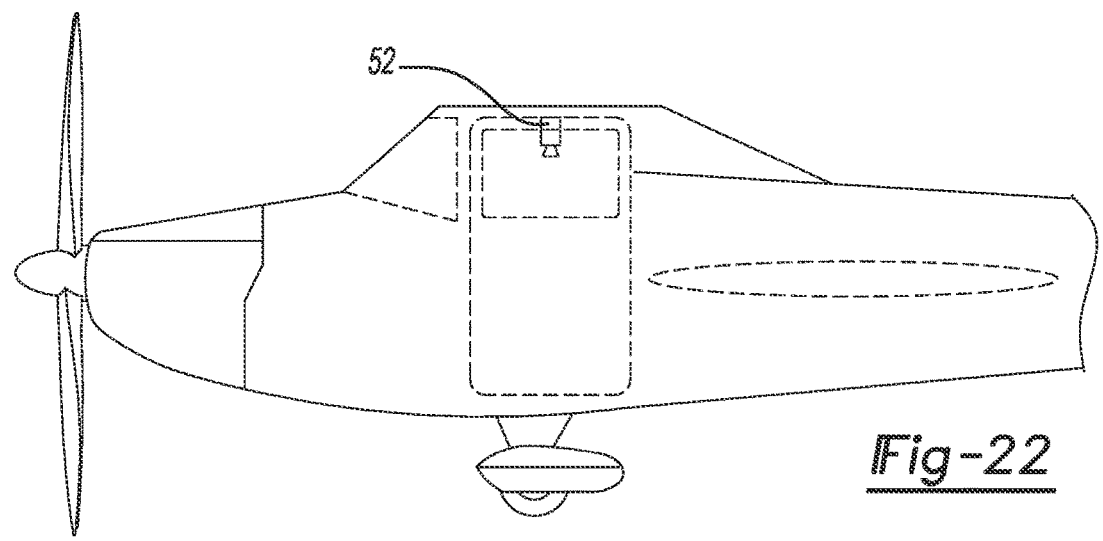
_Fig-22_
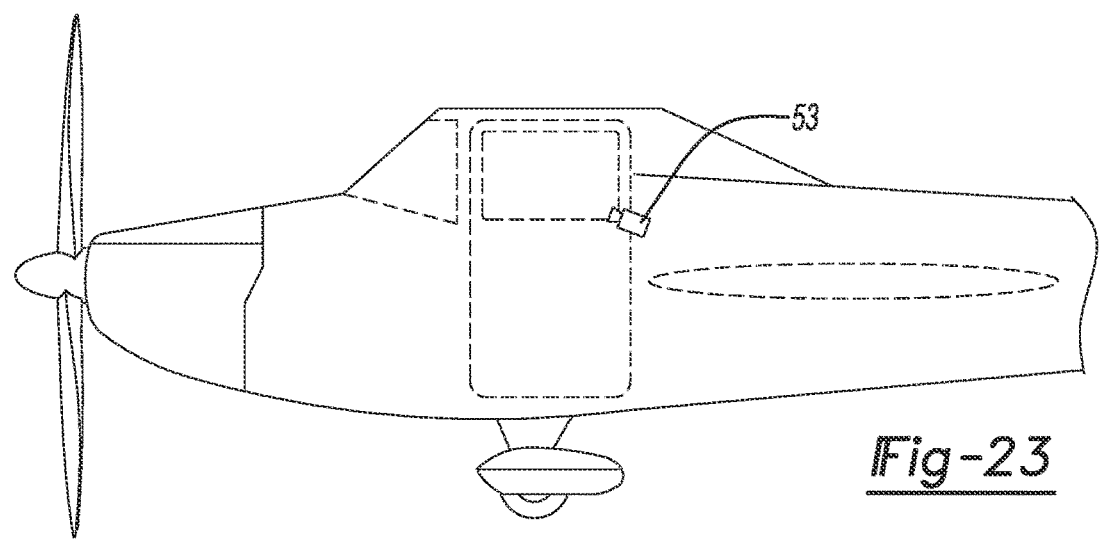
_Fig-23_
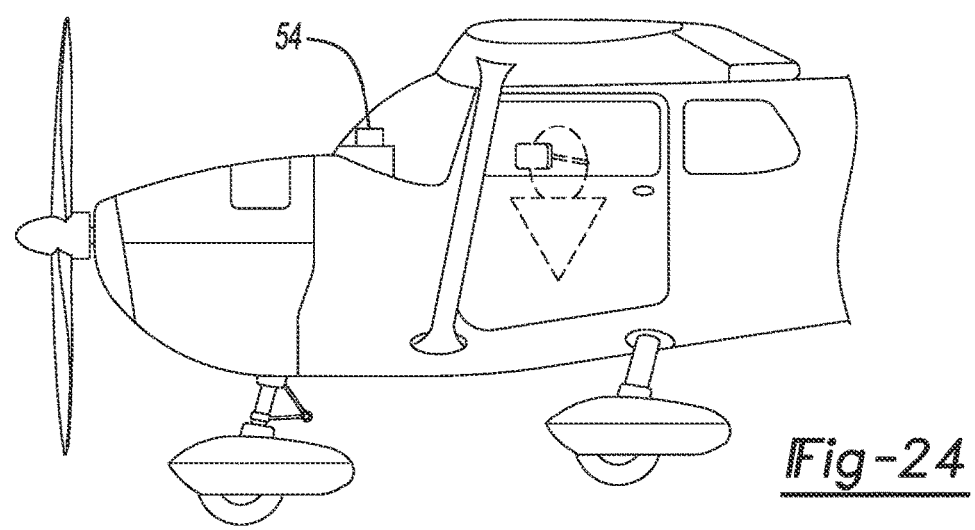
_Fig-24_

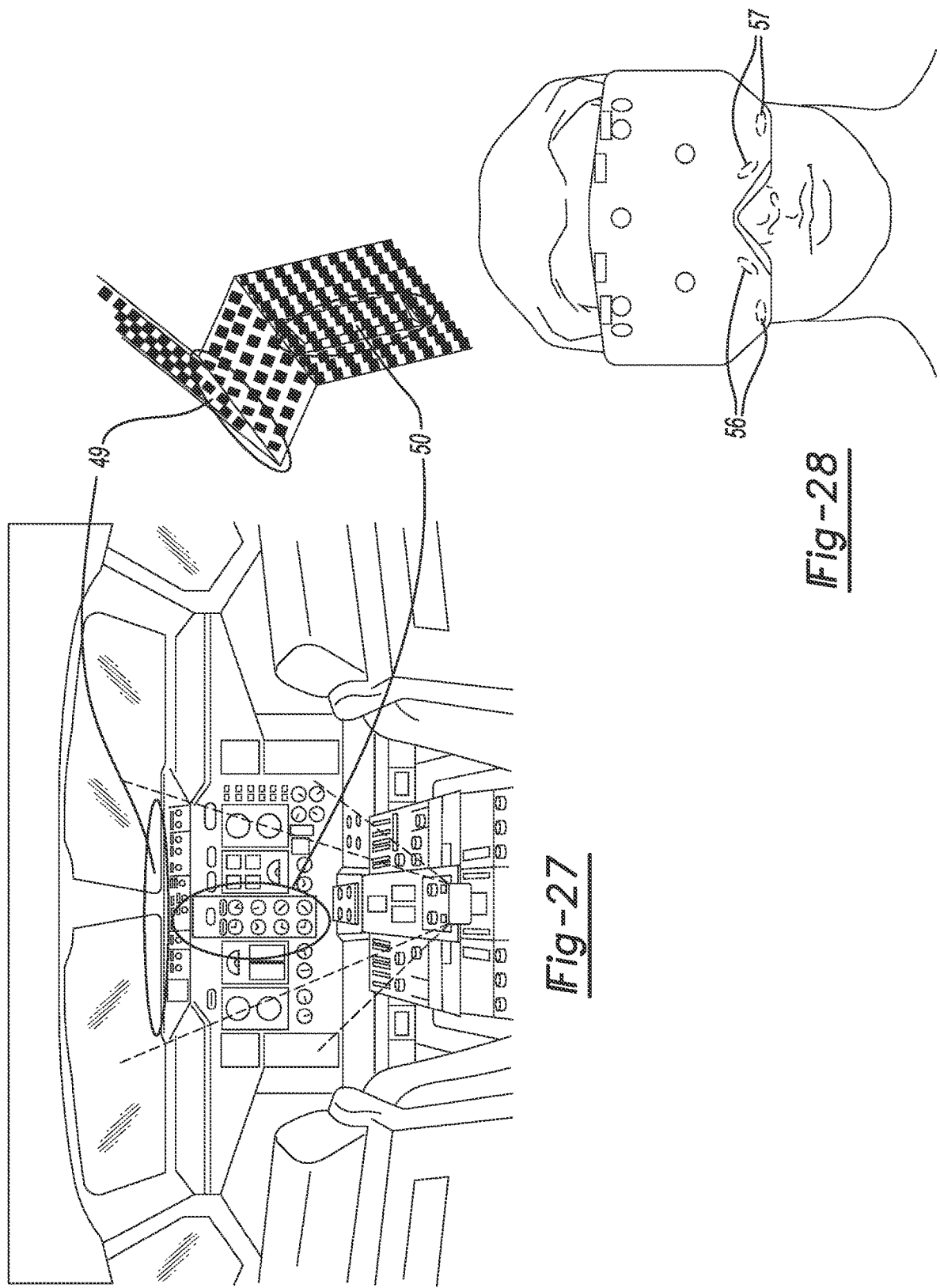

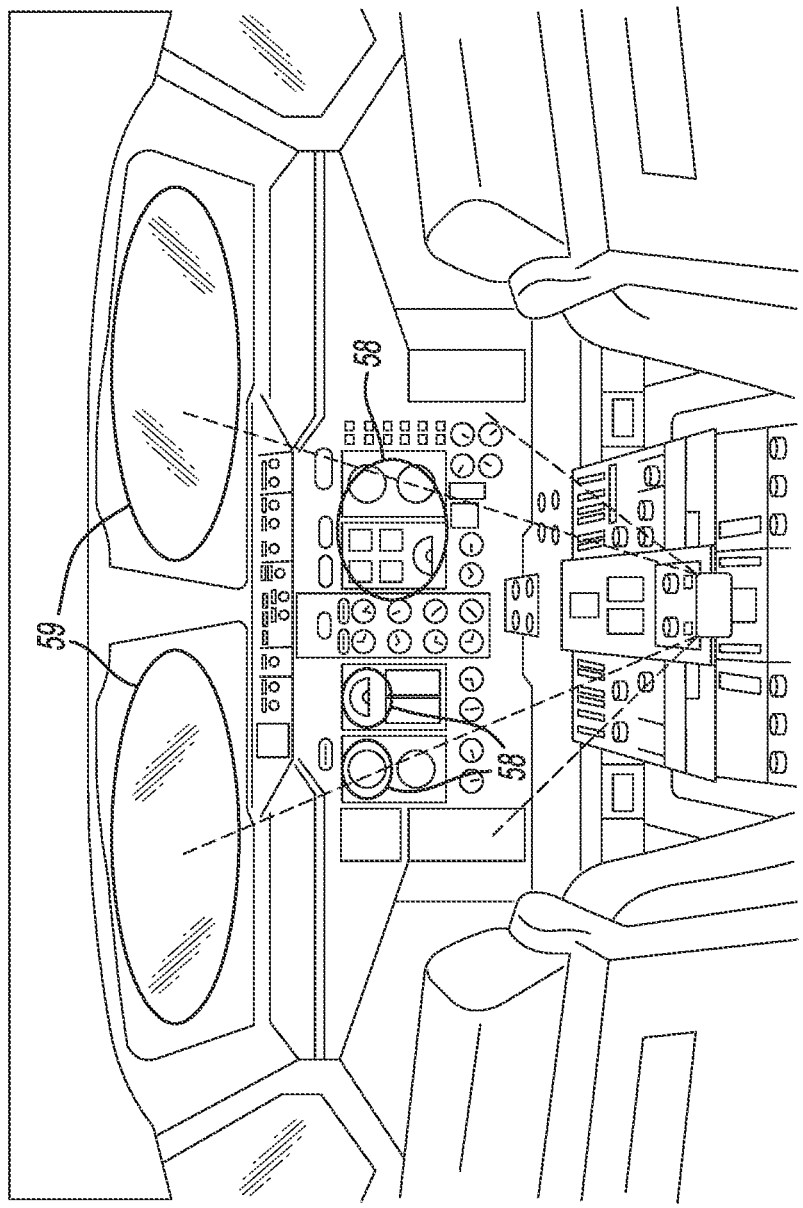
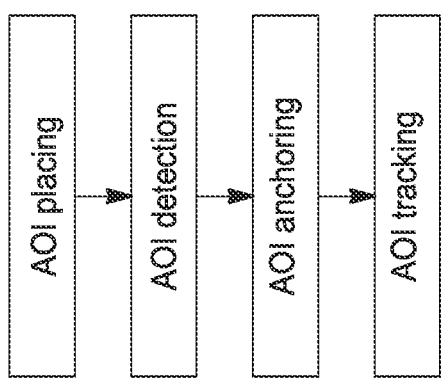
Fig-29

MIXED-REALITY VISOR FOR IN-SITU VEHICULAR OPERATIONS TRAINING

CROSS-REFERENCE TO RELATED APPLICATIONS

This application is an U.S. National Phase Application under 35 U.S.C. 371 of PCT International Application No. PCT/US2021/064043, filed Dec. 17, 2021, which claims the benefit of the following: U.S. Provisional Application No. 63/128,163, filed on Dec. 20, 2020; U.S. Provisional Application No. 63/180,040, filed on Apr. 26, 2021; and U.S. Provisional Application No. 63/190,138, filed on May 18, 2021. The entire disclosures of each of the above applications are incorporated herein by reference.

FIELD

The present disclosure relates to mixed reality devices and, more particularly, relates to a mixed-reality visor device for selective control of a user's field of view.

BACKGROUND AND SUMMARY

This section provides background information related to the present disclosure, which is not necessarily prior art. This section provides a general summary of the disclosure and is not a comprehensive disclosure of its full scope or all of its features.

According to the principles of the present teachings, systems and methods are provided for modifying a view perceived by a user who is substantially contained within an enclosure. The present systems and methods provide benefits and applications in a wide variety of industries, activities, environments, and situations. In the interest of providing a robust disclosure illustrative of the unique contributions to the art, however, the present disclosure will be provided in connection with aircraft flight training applications. This description should not be regarded as limiting the potential uses, benefits, and/or claims, unless specifically stated.

In some embodiments according to the principles of the present teachings, a system is provided including the following: a view-blocking wearable user visor-headset having a display surface and see-through camera; a distinguishing system configured to detect regions corresponding to an exterior of the enclosure from regions contained within an interior of the enclosure and output a region signal; and a vision system configured to overlay imagery graphics upon the display surface of the view-blocking wearable user visor-headset based on the region signal. Details relating thereto will be provided herein.

Generally, according to the principles of the present teachings, a mixed reality device is provided that is to be worn by a user in the area of flight training, particularly preparation and certification for flight in reduced visibility conditions resulting from clouds, fog, haze, smoke, or other adverse weather conditions or lack of sunlight (night operations).

By way of non-limiting example, pilots completing basic flight training are initially qualified to fly only under conditions permitting substantial visibility outside the cockpit so that aircraft orientation relative to the ground or distant horizon is easily viewed. Having a visible ground reference enables the pilot to both control the aircraft and visually see obstructions and other air traffic by pilot. This initial condition or restriction of qualification is termed Visual Flight Rules (VFR) by the U.S. Federal Aviation Administration (FAA). In order to fly when visibility is restricted, such as by clouds or fog, a pilot must demonstrate proficiency at maintaining flight control with reference only the instrument panel; this is termed as flight under Instrument Flight Rules (IFR) and requires additional training and certification.

The FAA defines weather-related flight conditions for VFR and IFR in terms of specific values for cloud ceiling and visibility. U.S. Federal Regulations for VFR require a ceiling greater than 3,000 feet above-ground-level (AGL) and horizontal visibility of greater than 3 miles in most airspace (i.e., visual meteorological conditions (VMC)). VFR establishes that VMC is sufficient for pilots to visually maintain separation from clouds and other aircraft. When weather conditions or other factors limit or reduce visibility and/or cloud ceilings below VMC, then these conditions are generally referred to as instrument meteorological conditions (IMC) and require a pilot to fly under Instrument Flight Rules (IFR). By way of example, IMC may exist when cloud ceilings drop to less than 1,000 feet above ground level (AGL) and/or horizontal visibility reduces to less than 3 miles.

Due to these reduced weather conditions or other factors that can result in pilot disorientation, a pilot trainee or pilot must complete specialized training in order to fly under IFR conditions because there may be little to no outward visibility from the cockpit to the exterior environment. Such training includes receiving specialized instruction from a certified flight instructor to simulate conditions where visibility outside the aircraft is limited. This is typically accomplished by the pilot trainee or pilot wearing simple view-limiting devices (VLDs), such as goggles, hoods, or visors (see FIG. 1A) that obstruct the pilot trainee or pilot's view outside the cabin or aircraft. Therefore, the pilot trainee or pilot must utilize only flight instruments (such as an artificial horizon, airspeed indicator, and other gauges) to maintain controlled flight and navigation. An accompanying flight instructor supervises the pilot trainee or pilot operating while "under the hood" in order to simulate IMC, although the flight may actually be taking place under actual VMC. This artificial view restriction facilitates IFR training irrespective of actual weather conditions thus facilitating more rapid training.

There are a number of relevant points regarding IFR vs VFR flight. For example, IFR flying challenges pilots with multi-tasking as they visually scan an array of instruments monitoring everything from equipment status to aircraft orientation to area navigation. Task-saturation occurs when the pilot becomes overwhelmed with information and can no longer keep up with flying the aircraft. Saturation may result from unexpected events such as equipment failures or inadvertent flight into compromised weather conditions. Such disorientation or confusion has led to loss of control accidents. It is therefore important that both new and veteran IFR pilots establish and maintain a high level of proficiency in IFR flying.

Visual Meteorological Conditions (VMC) generally require 3 statute miles visibility with aircraft remaining clear of clouds at a minimum of 500 feet below, 1000 feet above, and 2000 feet horizontally. These minimums may increase or decrease slightly based on the type of controlled airspace (near vs away from an airport for example). VMC is a regulatory prerequisite of VFR flying.

Separate from the aforementioned discussion, Mixed-Reality (MR)—not to be confused with Virtual-Reality (VR) or Augmented-Reality (AR)—is an interactive experience where computer-generated perceptual information is superimposed on a predominantly real-world environment. MR can be defined as a system that fulfills three basic features: a combination of real and virtual worlds, real-time interaction, and accurate three-dimensional (3D) registration of virtual and real objects. The overlaid sensory information can be constructive (i.e., additive to the natural environment), or destructive (i.e., masking of the natural environment). This experience is commonly implemented in the form of specialized goggle or visor hardware that the user wears to seamlessly interweave the real physical world with elements of computer-generated imagery. In this way, mixed reality only modifies a user's perception of a chiefly real-world environment, whereas virtual reality completely replaces the real-world environment with a simulated one.

The primary value of mixed reality is the way components of the digital world blend into a person's perception of the real world, not as a simple display of data, but through the integration of immersive sensations, which are perceived as natural parts of an environment. Commercial mixed reality experiences have been largely limited to entertainment and gaming businesses with some industrial applications in medicine and other areas.

Augmented Reality (AR) is associated with visors designed to project generated digital imagery upon a clear, see-through lens that permits users to directly view the remaining natural environment. Because a clear lens is essentially used as a computer screen in this case, the associated digital imaging overlay is characteristically translucent such as with a Heads-Up-Display (HUD) and therefore cannot be used to, as effectively, fully block a user's view of surroundings. For example, AR applications typically generate text data overlays to a work environment such as during medical procedures where a surgeon prefers not to look away from the patient for any duration.

Widespread commercial use of MR technology for IFR flight training has not been pursued due in part to complexities involved with processing a dynamic environment such as an aircraft cockpit during flight operations. The present teachings describe materials and methods that enable implementation of streamlined MR hardware and software that offers improved cost-effectiveness, safety and quality of training.

Conventional IFR training employs long-standing View Limiting Devices (VLDs) to block views outside the aircraft's windows. Aircraft cockpit windows are typically placed above and to the sides of an instrument gauge panel. Industry standard VLD goggles are correspondingly shaped like blinders with opaque surfaces that inhibit views beyond the instrument panel. These IFR goggles, visor, or "hoods" are usually constructed from inexpensive plastic and are head-mounted using elastic or fabric straps. Some common types available to date are illustrated in FIGS. 1A-2B and terminology is used interchangeably herein.

An accompanying flight instructor or safety pilot supervises the student wearing the visor or goggles to ensure it is worn properly while also monitoring aircraft motion and orientation with reference to external views. Such partial view blocking visors or goggles are also used during practical flight tests where a candidate is required to demonstrate proficiency in IFR flight to an FAA examiner.

Being essentially blinders, conventional VLDs pose shortcomings in effectively replicating IFR conditions. Often the fit and positioning of the formed view-blocking areas do not conform well to the span of the instrument panel and user's height, requiring the pilot to maintain an unnatural and uncomfortable head-down position to prevent view of the aircraft exterior. Such head repositioning has a direct effect on how aircraft motion is sensed and interpreted by the user thus presents potentially dissimilar effects to those that would be experienced under real IFR conditions. Furthermore, aircraft movements due to turbulence or maneuvering may cause inadvertent head movements that momentarily expose an exterior view to the user. Such glances, however brief, can provide enough information to reorient the pilot user hence diminishing value of the training session. VLDs also do not offer the capability to impose more complex IFR scenarios such as sudden transitions from clear to obscure weather conditions. One of the major risk factors with flight safety is inadvertent flight into IMC such as clouds during night flying. In such cases there is a surprise factor that makes maintaining proper aircraft control a challenge. VLDs are worn and removed deliberately therefore do not offer possibility for replicating sudden and unintended flight into IFR conditions. Nor do they offer methods for gradual changes in exterior visibility.

The present teachings provide numerous advantages. For example, the present teachings provide improved safety, efficiency, and effectiveness of training for vehicular operations during adverse conditions such as poor visibility due to fog or rain. In the case of aircraft, particularly small general aviation aircraft, serious accidents resulting from pilots inadvertently flying from clear weather (VMC) into inclement weather (IFR or IMC) unfortunately continue to occur on a regular basis despite increased training and awareness. Such accidents frequently result in a loss of control of the aircraft or controlled flight into high-elevation terrain such as mountains or high-rise objects. Oftentimes, even experienced IFR-rated pilots encounter mishaps in IMC due to lapses in judgement and eroded skills. The rate of these loss of control in IMC accidents continue to be of concern to the FAA and general aviation community.

A recognized contributor to these weather-related accidents is a lack of adequate primary or recurrent IFR flight training. Much of this training takes place in ground-based flight simulators or employ the use of VLD hoods or goggles to simulate instrument conditions during actual flight. These simple tools offer limited realism in terms of replicating instrument meteorological conditions as well as limited control over simulated training conditions. For example, although ground-based flight simulators used in primary flight training can block cockpit exterior views as desired, they typically do not incorporate motion; a major factor contributing to loss of spatial orientation leading to loss of aircraft control. Real life instrument flight conditions remove visual reference to the earth's horizon, which normally provides a means for the pilot to maintain orientation and aircraft control. Losing this visual reference may lead to misinterpretation of aircraft movements leading to pilot disorientation and subsequent loss of aircraft control.

In the case of actual flight with conventional view-limiting devices such as head-mounted visors or goggles, variations in the wearer's height, external lighting, and movements of the aircraft due to turbulence or maneuvering may unintentionally offer momentary glimpses of the aircraft exterior sufficient to reorient the pilot trainee. These unintended breaks in blocked visibility detract from the difficulty of practice conditions so can lead to significant deficiencies in skill over time. Furthermore, trainees need to apply conventional IFR hoods or visors manually for IFR-training phases of flight, which removes the element of surprise that often accompanies actual encounters with IMC such as inadvertent flight into clouds. Pilots accidentally flying into IMC can experience significant anxiety and disorientation due to the sudden loss of outside visual reference combined with abrupt aircraft movements associated with turbulence and other convective activity associated with inclement weather.

An object of the present teachings is enablement of simplified integration of visualization control offered by computer-based simulation with real life training conditions via a novel mixed-reality (MR) system and method. In some embodiments, the system is provided having an MR-visor headset worn by a pilot-user during actual IFR in-flight training. In some embodiments, the system utilizes a built-in viewer, internal- and external-radiation energy sources and sensors such that the user's view outside cockpit windows can be easily set and controlled during any phase of flight. In this way, the trainee can be subject to obstructed or altered views outside the cockpit regardless of head position and at the discretion of a flight instructor or examiner. An MR-visor for IFR offers a level of realism and control well beyond simple conventional VLD headwear used to date. Enhanced realism during IFR training can better prepare new instrument pilots, help maintain proficiency with experienced IFR-rated pilots, and provide flight examiners more rigorous methods for assessing a candidate's capabilities.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 22 illustrates electromagnetic energy emitters affixed to the top of an aircraft interior providing supplemental location data to the MR-visor headset controller.

FIG. 23 illustrates electromagnetic energy emitters affixed to the side console of an aircraft interior providing supplemental location data to the MR-visor headset controller.

FIG. 24 illustrates a location registration device affixed to the topside of an aircraft instrument panel.

Figure 25:
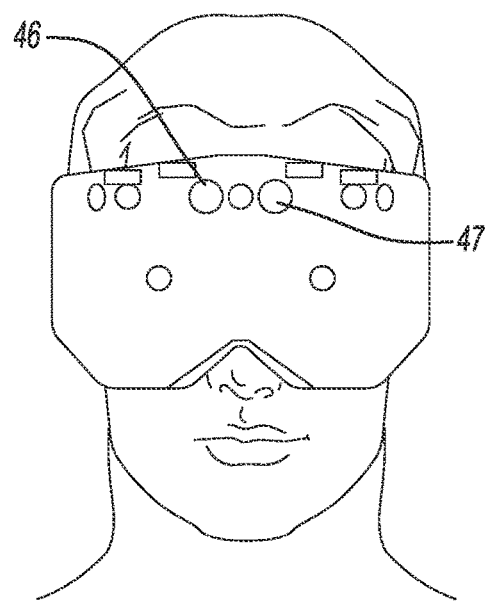

FIG. 25 provides a diagram of an MR-visor headset in accordance with the present disclosure employing time-of-flight (ToF) infra-red (IR) light emitter distance measuring equipment.

Figure 26:
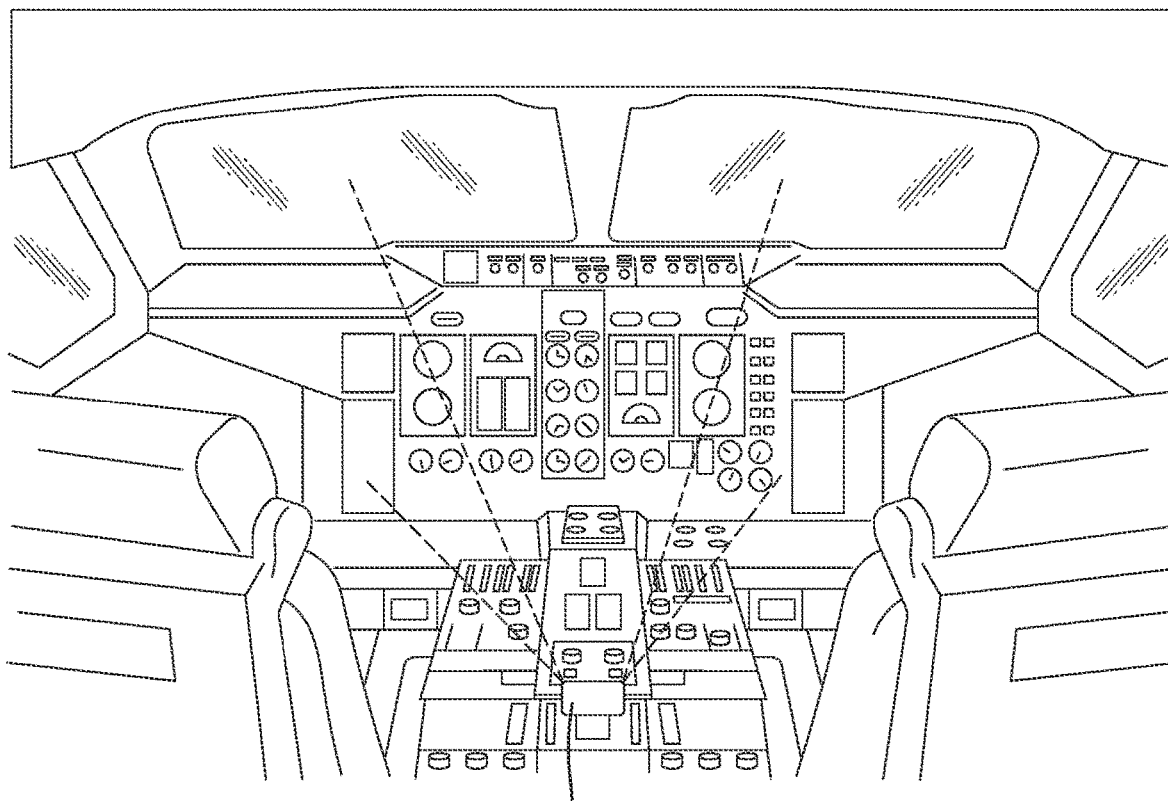

FIG. 26 illustrates a console-mounted stereo camera that maintains positional data on an aircraft flight instrument panel.

FIG. 27 illustrates a three-dimensional (3D) mixed-reality graphic image generated from the stereo camera (FIG. 26) replicating at least portions of the aircraft instrument panel and windshield regions.

FIG. 28 illustrates an embodiment of the MR-visor headset including inward-facing cameras for capturing user eye pupil movements and gaze-tracking.

FIG. 29 illustrates a methodology flow diagram for generating and collecting instant gaze tracking of multiple Areas-of-Interest (AOI) by the user.

Figure 30:
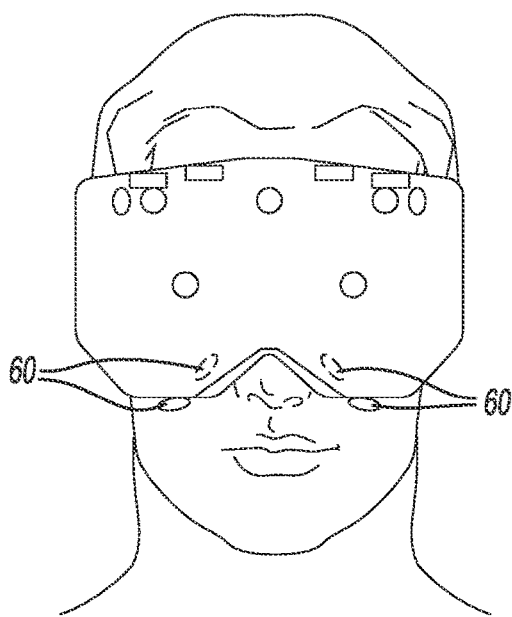

FIG. 30 illustrates multiple inward-facing RGB video cameras that capture the MR-visor headset user's facial expressions.

Figure 31:
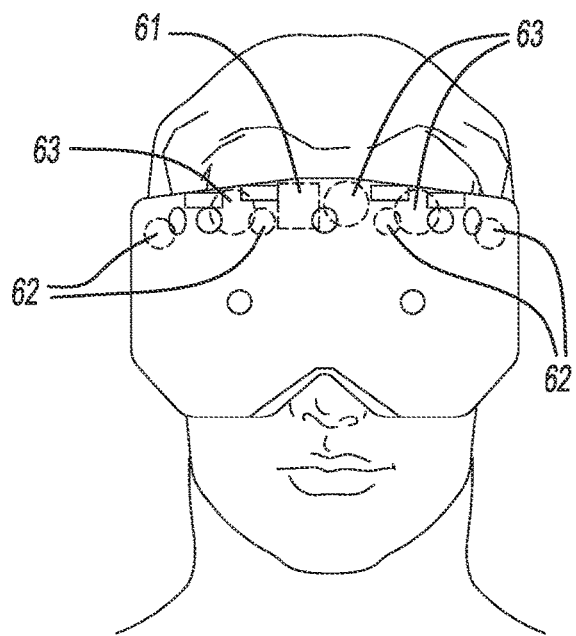

FIG. 31 illustrates sensors embedded in the MR-visor that track and record physiological parameters of the user.

Figure 32:
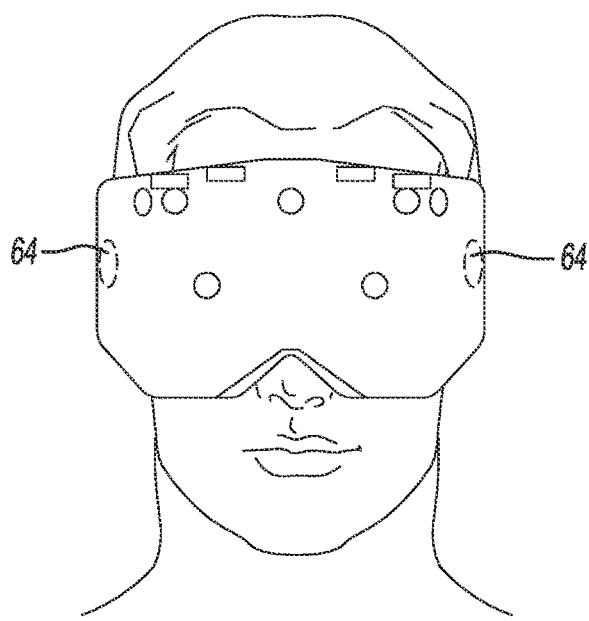

FIG. 32 illustrates an MR-visor with embedded audio speakers located near the user's ears.

Figure 33:
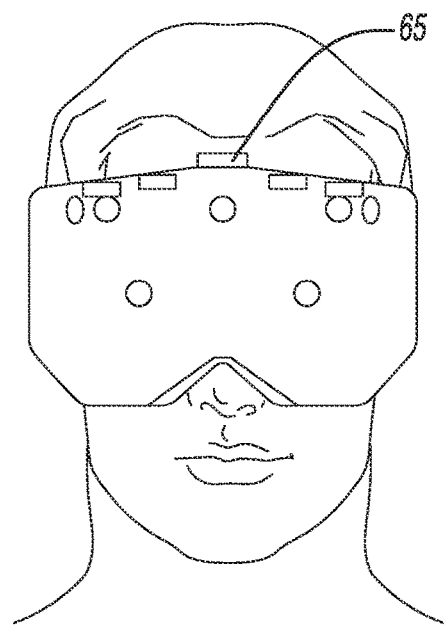

FIG. 33 illustrates an MR-visor with onboard Global-Positioning-System (GPS) tracking, data-input and -output device.

Figure 34:
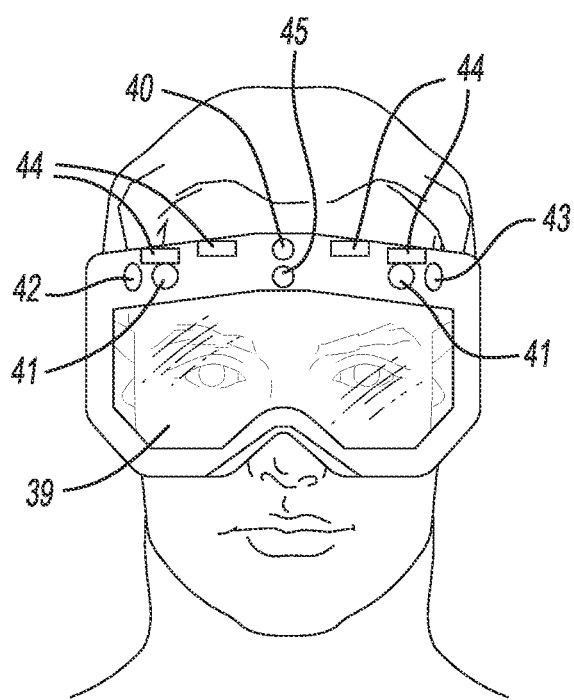

FIG. 34 illustrates a variant of the MR-visor employing a forward-facing transparent Liquid-Crystal-Display (LCD) or equivalent see-through display screen that permits direct view of the user's surroundings.

Figure 35:
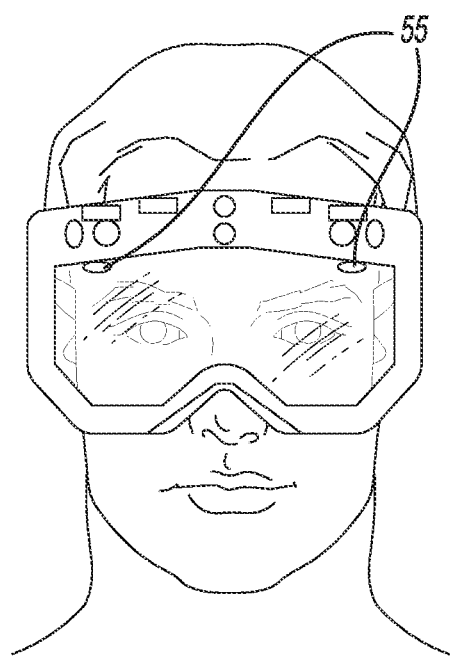

FIG. 35 illustrates a transparent display variant similar to FIG. 34 wherein additional emitters located within the visor direct software-controlled lighting effects towards the user's eyes.

Figure 36:
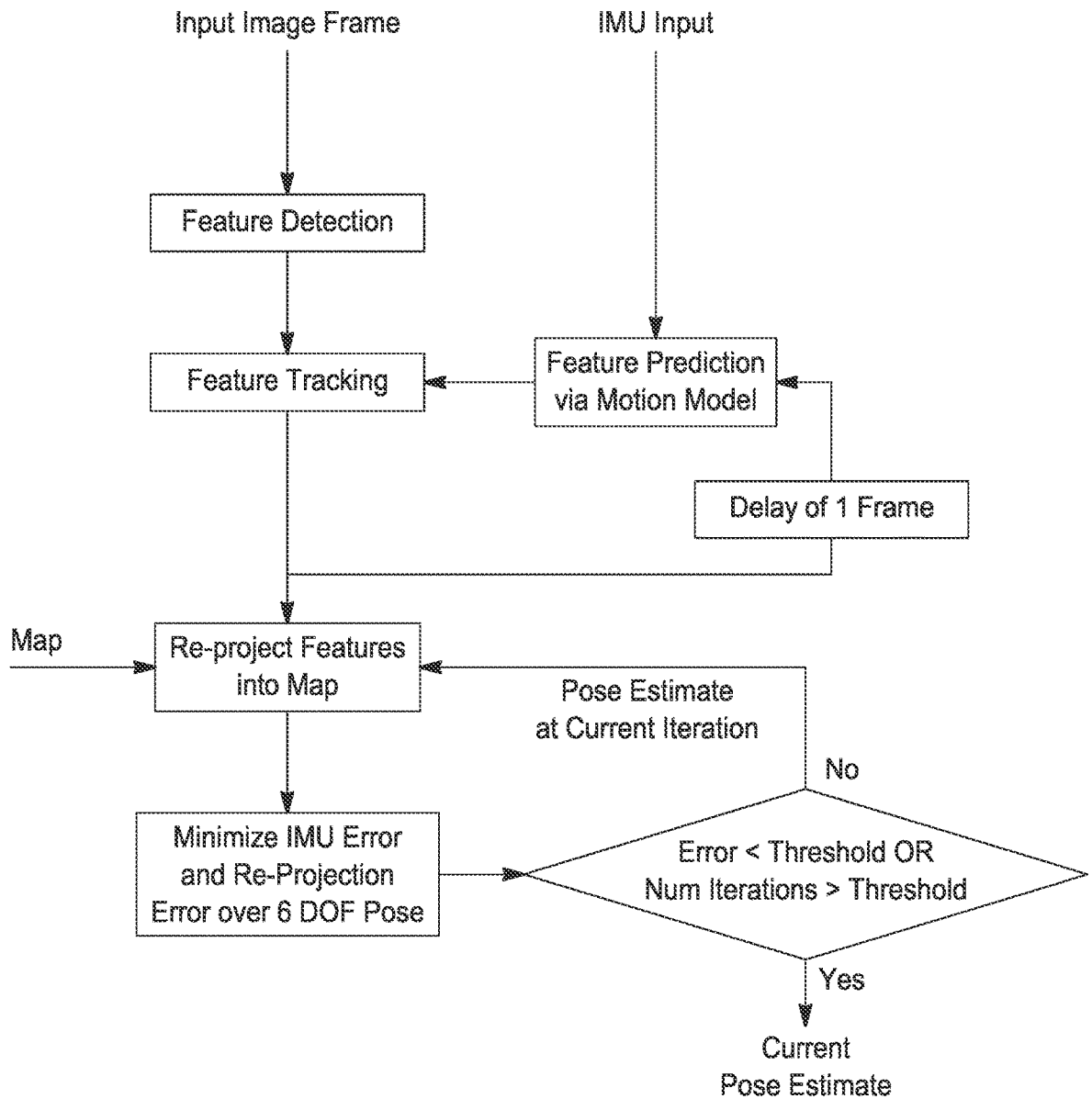

FIG. 36 illustrates a system-level overview of a visor pose localization process in accordance with the present disclosure.

Corresponding reference numerals indicate corresponding parts throughout the several views of the drawings.

DETAILED DESCRIPTION

Example embodiments will now be described more fully with reference to the accompanying drawings.

Prior Art: VR-, AR-, and MR-Reality Technology

Figure 1A:
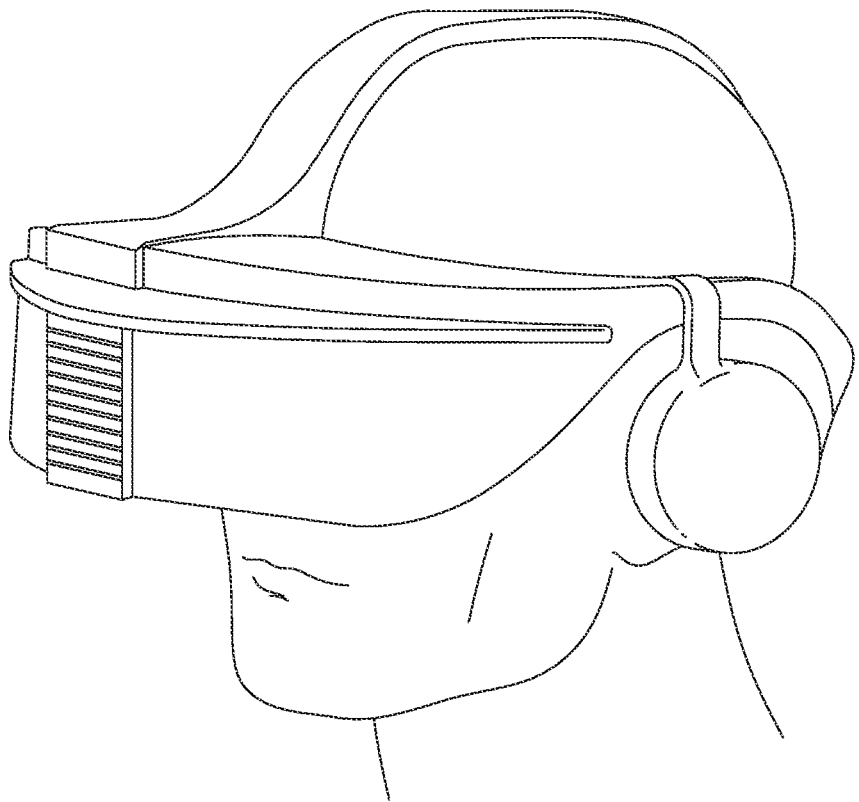
FIG. 1A is an image of a virtual reality headset representing existing art in the field of invention.

FIG. 1A is an image of a virtual-reality (VR) visor-headset representing relevant existing art in the field of invention. VR headsets like commercial gaming platforms Oculus Rift™ and Sony PlayStation™ VR employ head mounted displays (HMDs) to generate what appears to be life size, fully immersive, three-dimensional (3D) virtual environments. VR headsets are worn like goggles and incorporate image feeds into individual LCD displays and lenses (one per eye) thereby providing a stereoscopic 3D image of an artificial computer-generated environment. The VR headset allows the user to move his/her head to view these virtual surroundings within a predefined field of view typically from 110 degrees to full 360 degrees rotation. The computer vision control generating the associated moving or still images require a minimum frame rate 60 frames per second (fps) but are more typically capable or 90 or 120 fps in order to provide a more realistic perspective to the user. The VR headset hardware and software implement head tracking to maintain the proper location of image features relative to the user's perception. Head tracking utilizes a 6DoF (six degrees of freedom) system that plots the location of the user's head in a virtual coordinate plan so that head motions forward and backwards, side to side and shoulder to shoulder, otherwise known as pitch, yaw and roll can be registered in real time. Some of the internal components used in a head-tracking system include built-in gyroscope, accelerometer and a magnetometer but may also incorporate an external camera monitoring locator signals from the headset. Head tracking computing needs to be low latency in order to keep up with user head movements. Most conventional VR headsets can achieve latencies of 50 milliseconds or less. In addition to head tracking, VR headsets may integrate motion and eye tracking of the user through extended internal and external hardware in order to further enhance realism and the user experience.

Figure 1B:
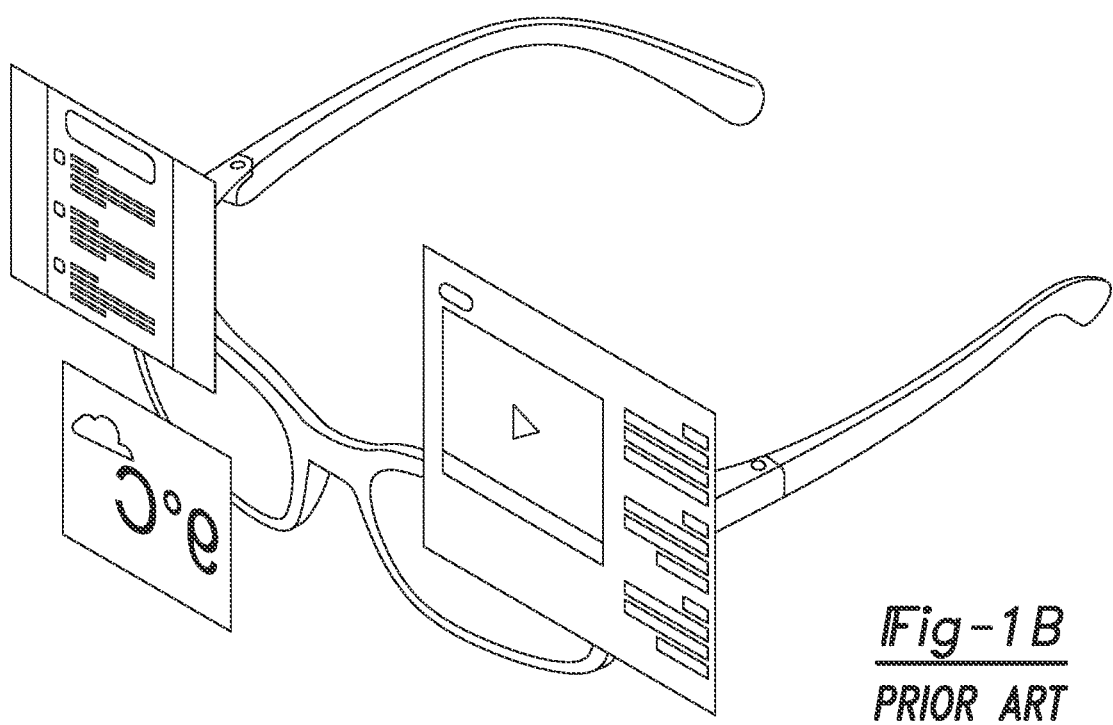
FIG. 1B is a drawing of augmented-reality glasses representing existing art in the field of invention.

FIG. 1B is a diagram of augmented reality (AR) glasses, representing other existing art in the field of invention. Whereas VR headsets provide a fully fabricated 3D virtual environment, AR instead provides an overlay of virtual elements onto actual surroundings. A commercial example of AR-glasses was provided by Google's Glass™ product released in 2013. This head-mounted hardware was worn similarly to conventional reading glasses. Computer-generated images are projected onto the clear lens positioned in front of the user's eyes so that data can be superimposed onto actual surroundings. Industrial applications for AR to date have concentrated on specialized industrial users such as surgical medicine, child learning, and security personnel. AR hardware is comprised of many of the same elements as VR headsets with the main difference being AR glasses provide direct view of actual surroundings via a see-through transparent screen instead of being blocked out as with VR's fully virtual environment.

Another variation of related art, termed Mixed-Reality (MR), lies between VR and AR. Transparency of the see-through lens screens of AR visors limit the opaqueness of computer-generated imagery on the resulting view of the environment. With MR, computer-generated imagery is combined with that of actual surroundings but without use of the clear-, see-through lens LCD screen used for AR. Instead, MR employs a fully enclosed visor similar to VR, that utilizes a built-in dual-lens camera to access 3D views of actual surroundings. This type of hardware facilitates opaque computer-generated graphics (as with VR) that can now augment visuals of actual surroundings via processing of camera-based imagery. Hence, MR can offer a more immersive version of augmented reality that is not limited by the transparent nature of a clear lens display. For example, an MR display can impose opaque three-dimensional (3D) objects such as extra virtual solid walls to a room whereas an AR-display would have difficulty preventing visual transparency through such a virtual wall from the user.

Conventional View-Limiting-Devices (VLDs)

Figure 2A:
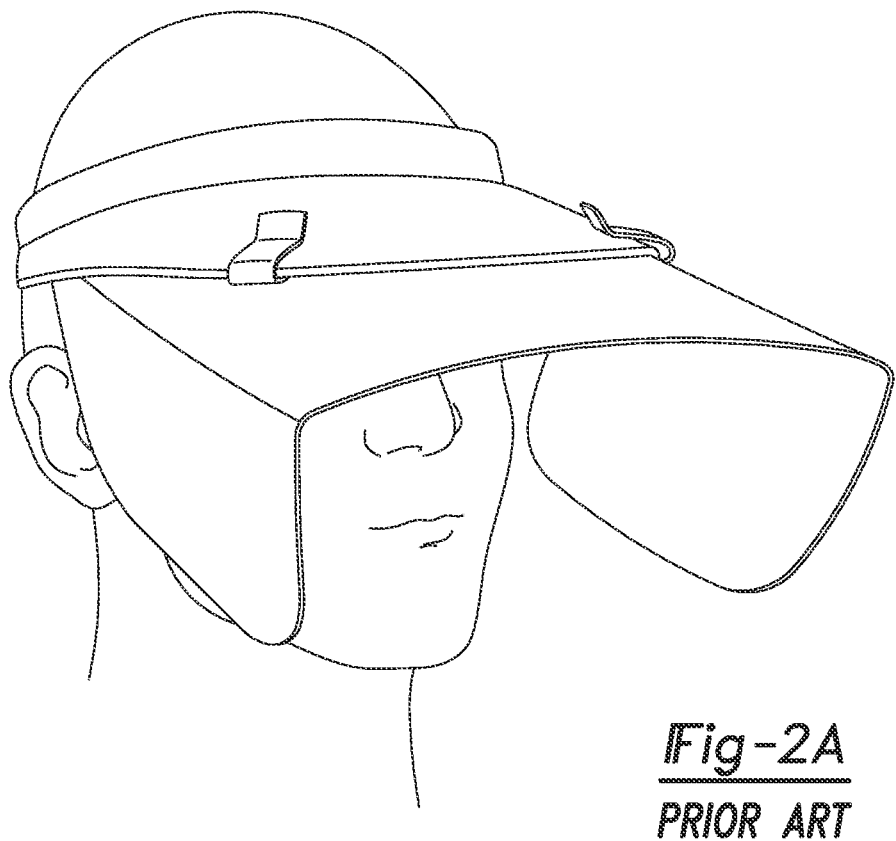
FIG. 2A is an image of conventional hood-style vision blockers commonly used for Instrument-Flight-Rules (IFR) flight training and examination.
Figure 2B:
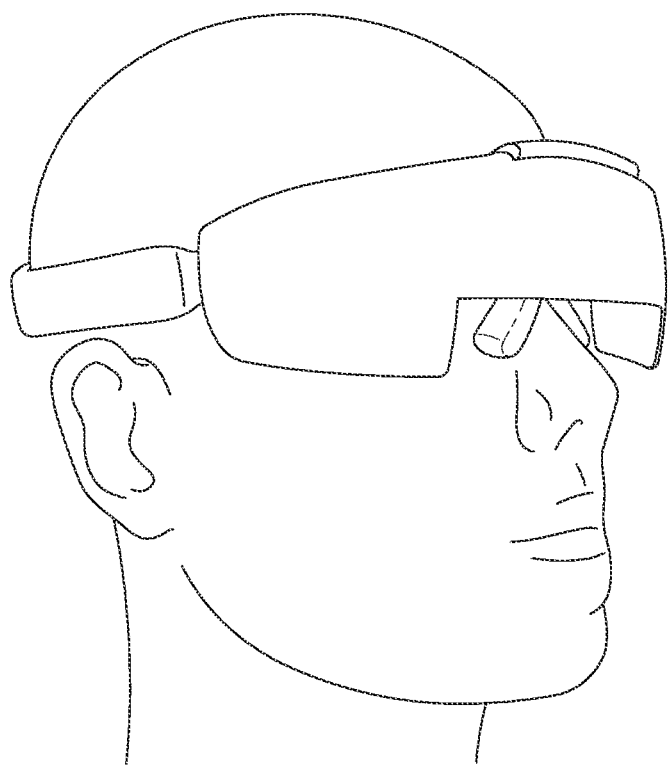
FIG. 2B is an image of conventional visor-style vision blockers commonly used for IFR flight training and examination.

FIG. 2A is an image of conventional hood-style vision blockers commonly used for IFR flight training and examination. This hood is mounted to the user's head via lateral and topside straps or fasteners. The user (pilot trainee) is thereby prevented from seeing the aircraft exterior through the cockpit windows so that flight can be conducted only by reference to the forward instrument panel. This blocked view is subject to head movements of the user, where momentary shifts in position due to turbulence or other motion may expose portions of the external window view to the user. FIG. 2B is a more compact design vision blocker comprised of goggles that block most of the user's forward and lateral views so that ideally only the flight instrument panel is visible. IFR hoods or goggles are typically constructed from low-cost molded plastic and are applied and removed deliberately by the user before and after use. Conventional IFR hoods require the pilot trainee to apply the head-mount and then maintain an unnatural downward head position to prevent views of the aircraft exterior. Since human physiology relating to balance and orientation involves the inner ear and head position, it would be preferable for trainees to maintain natural movements throughout training scenarios.

Figure 3:
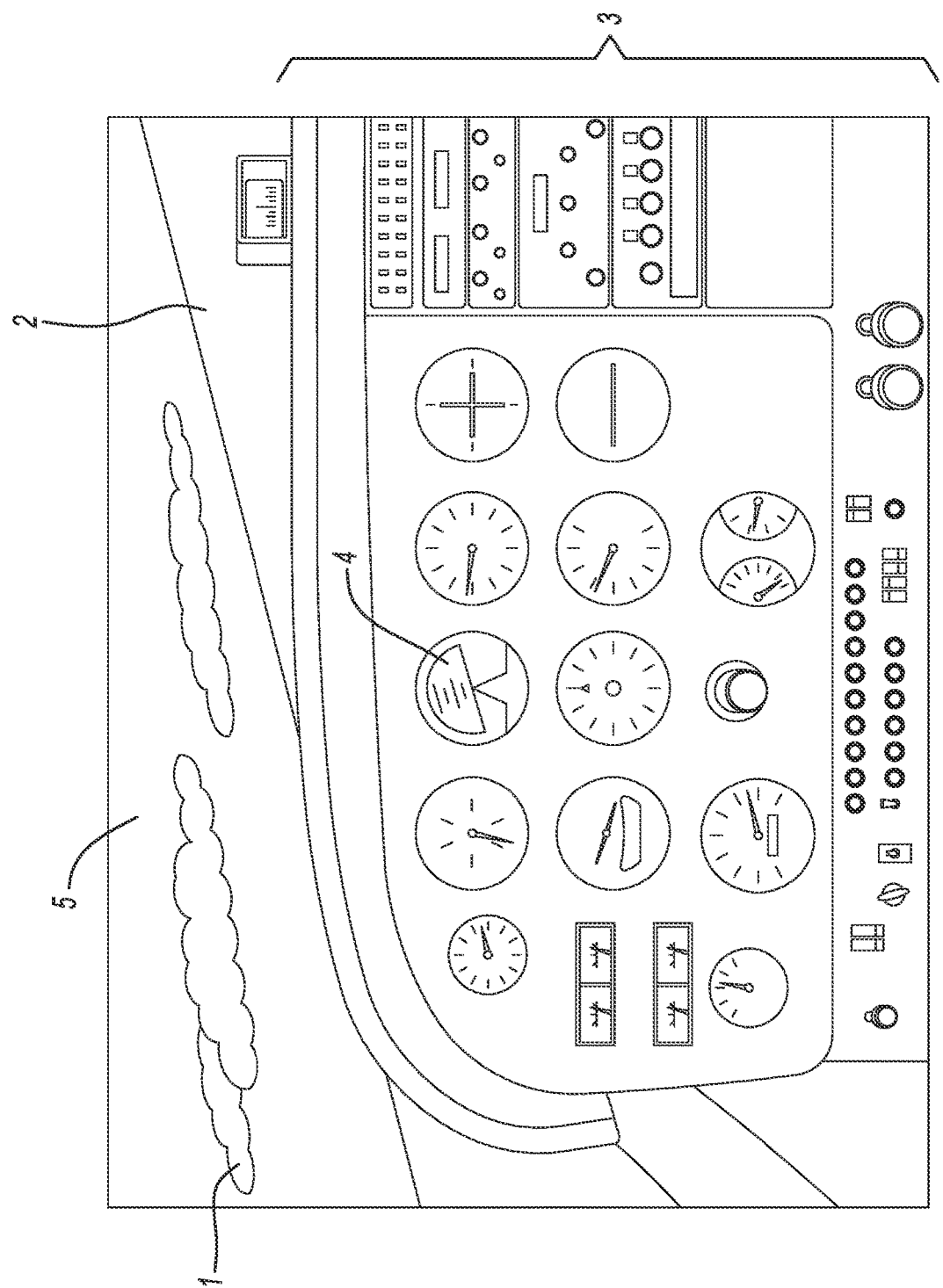
FIG. 3 is a perspective view from inside an aircraft cockpit displaying the interior instrument panel and an unobstructed forward view of the exterior environment.
Figure 4A:
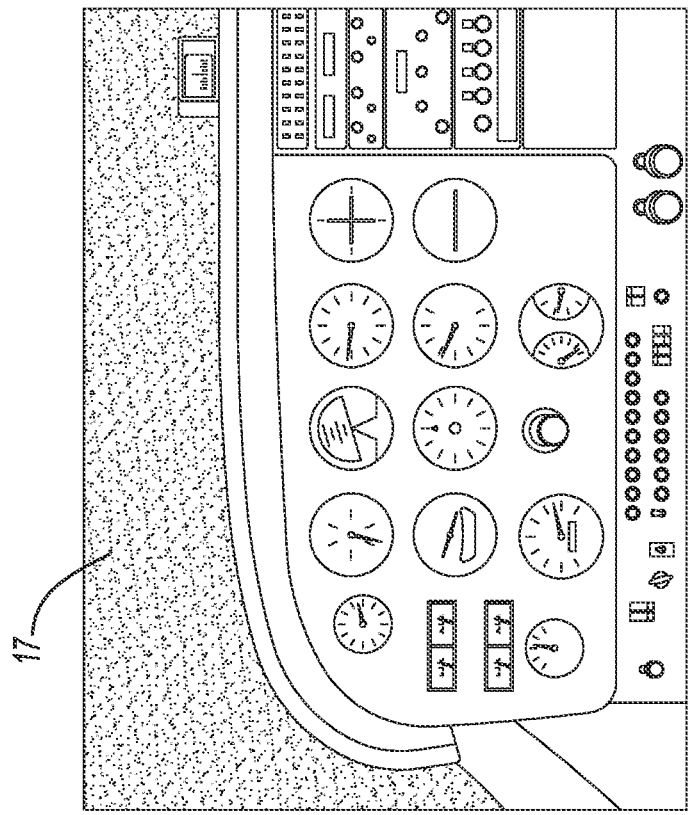
FIG. 4A is a comparative perspective view from inside an aircraft cockpit displaying the interior instrument panel and an unobstructed forward window view of the exterior environment.
Figure 4B:
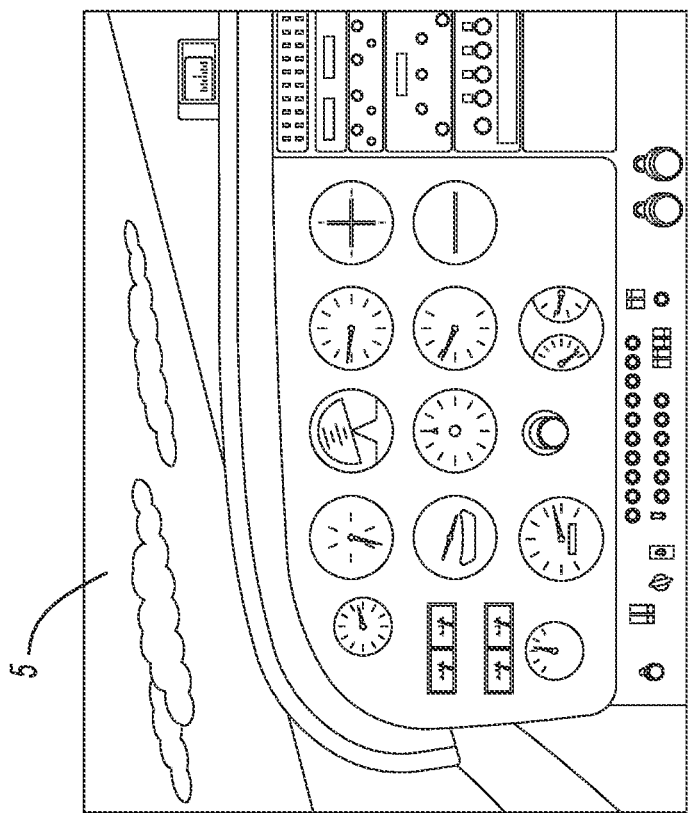
FIG. 4B is a comparative perspective view from inside an aircraft cockpit displaying the interior instrument panel and a fully obstructed forward window view of the exterior environment.

FIGS. 3 and 4A show a perspective view from inside an aircraft cockpit displaying the interior instrument panel 3 and an unobstructed forward view 1 of the exterior environment. This diagram represents Visual Flight Rules (VFR) conditions where views outside the cockpit window 5 are clear 1 of cloud obstruction and allow sighting of the actual ground and/or horizon 2. Flight under VFR is conducted with visual reference to the ground horizon 2 in order to maintain aircraft orientation and direction. Flight instruments on the forward panel 3 such as the artificial horizon 4 provide supplemental flight information for pitch and roll during VFR operations. FIG. 4B represents the same perspective as FIGS. 3 and 4A except under Instrument Flight Rules (IFR) conditions 17 where the exterior view outside the cockpit window is limited or completely blocked due to weather and/or lack of lighting. Under such conditions a pilot cannot rely on outside visual references such as terrain or horizon so must maintain control of the aircraft using only the instrument panel 3 which houses various gauges that describe aircraft orientation and motion. Pilots require specialized training to obtain an IFR rating that permits them to fly during such conditions of limited or no visibility 17. Without proper training, a pilot is liable to lose orientation and control of the aircraft due to lack of skill and physiological vulnerabilities that amplify disorientation under such conditions.

MR-IFR Visor of the Present Disclosure

Figure 5:
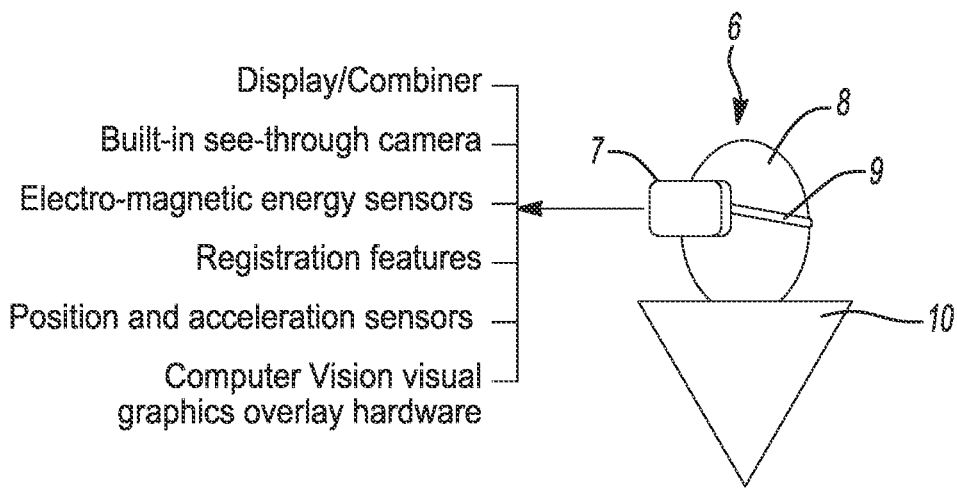
FIG. 5 is a diagram describing basic elements of the mixed-reality visor (MR-visor) headset provided by the present disclosure.

FIG. 5 provides a visual representation 6 and description of the MR-visor invention 7 referencing the user's head 8 and torso 10 areas to illustrate fastening of the invention 7 by means of straps or bands 9. The MR-visor 7 may include all typical components of existing commercial VR-, AR- or MR-headsets including but not limited to a combiner, camera, sensors, registration features, signal emitters, and computer hardware and software driving image generation and overlay.

In accordance with some aspects of the present teachings, the basic MR-IFR visor utilizes standard components of a head-worn virtual reality (VR) display (i.e. VR headset) which utilizes video see-through display technology for immersing the user in a digitally-enhanced visual environment. Such standalone VR headsets typically include the following:
 a) A dual Liquid-Crystal Display (LCD) panel or an Organic Light Emitting Diodes (OLED) technology-based display panel supporting a refresh rate of at least 60-120 fps for each eye at high resolution (e.g., 1920 pixels);
 b) Lenses with Interpupillary Distance (IPD) adjustable mechanically for each user;
 c) A Central Processor Unit (CPU) that generates virtual imagery graphics with additional processing units dedicated to computing motion-tracking outcomes;
 d) An internal Random-Access-Memory (RAM) unit;
 e) An embedded long-term digital storage unit;
 f) A battery unit acting as the power source; and
 g) A headband that straps the headset onto the user's head.

Figure 6:
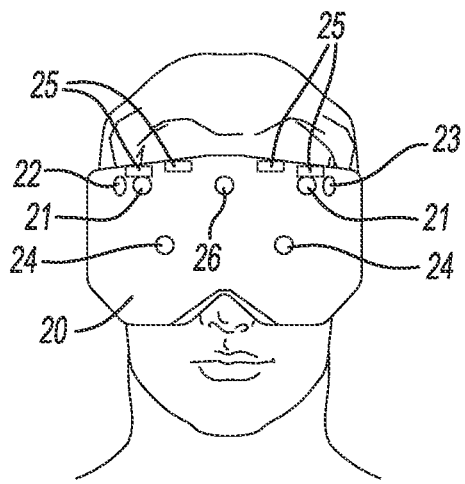
FIG. 6 illustrates core components of the MR-visor headset system according to some aspects of the present disclosure.

Additional sensors may be used for tracking extended head movements as well as specific objects in the surroundings. FIG. 6 illustrates the core components of the system according to some embodiments. In the case of a pilot user, the eye-forward display 20 enables MR content to be superimposed both inside the aircraft cockpit environment as well as the external environment viewable outside the aircraft's window panels. The hardware thus becomes a mixed-reality (MR) headset that covers the full field-of-view of the user, preventing any peering from the side, below, or above the display as frequently occurs with conventional head-worn view limiting devices.

The MR display is therefore similar to VR headsets in form, but now capable of adding precision-located holographic content to the actual surroundings by use of camera-assisted tracking and see-through technology. For example, this basic embodiment may include four (4) head-tracking cameras, two (2) directed forward 21 (above right and left eyes) and two (2) directed diagonally to the left side 22 and the right side 23. By using sensor fusion-based positional tracking methods, these cameras continuously track the position of the user's head in relation to the physical environment without need for any additional external measurement devices. Each of the head-tracking cameras contains an Inertial Measurement Unit (IMU) which in turn includes an accelerometer and a gyroscope that allow high-frequency measurement of headset orientation. Together the cameras and their IMUs enable precise and reliable positional tracking based on sensor fusion. Inside-out optical positional tracking utilizes Simultaneous Localization and Mapping (SLAM) algorithms applied to the image stream of the head-tracking cameras. This "inside-out" approach is contrary to the most common "outside-in" positional tracking approach employed in consumer-grade VR headsets. Inertial tracking methods based on the data stream produced by the IMUs supplement the optical positional tracking methods, which is particularly useful in the event of abrupt head movement.

Figure 7A:
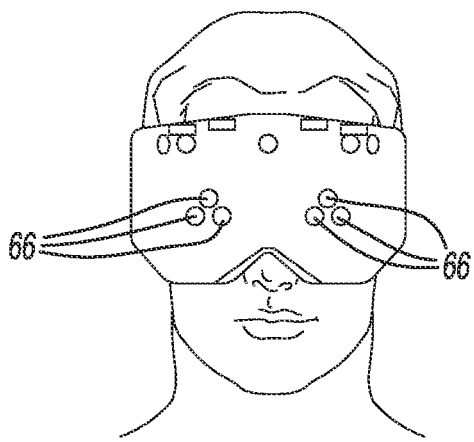
FIG. 7A illustrates a variation of the MR-visor headset of the present disclosure employing multiple fixed-position lenses corresponding to different focal lengths.
Figure 7B:
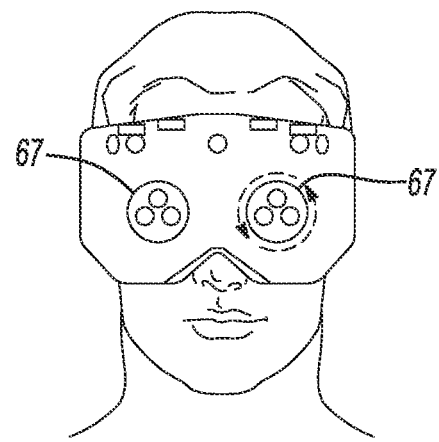
FIG. 7B illustrates a variation of the MR-visor headset of the present disclosure utilizing multiple moveable optical lenses that can be mechanically cycled via a rotating barrel assembly to provide different focal length views to user.
Figure 8A:
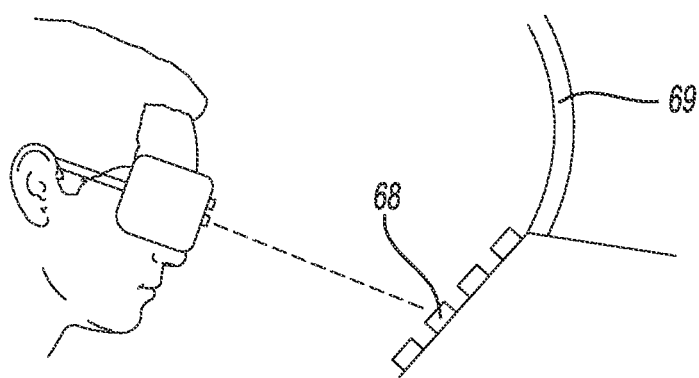
FIGS. 8A and 8B illustrates use of a forward-looking time-of-flight (ToF) depth camera where continuous measurement of forward objects is used to adjust lens focal length.
Figure 8B:
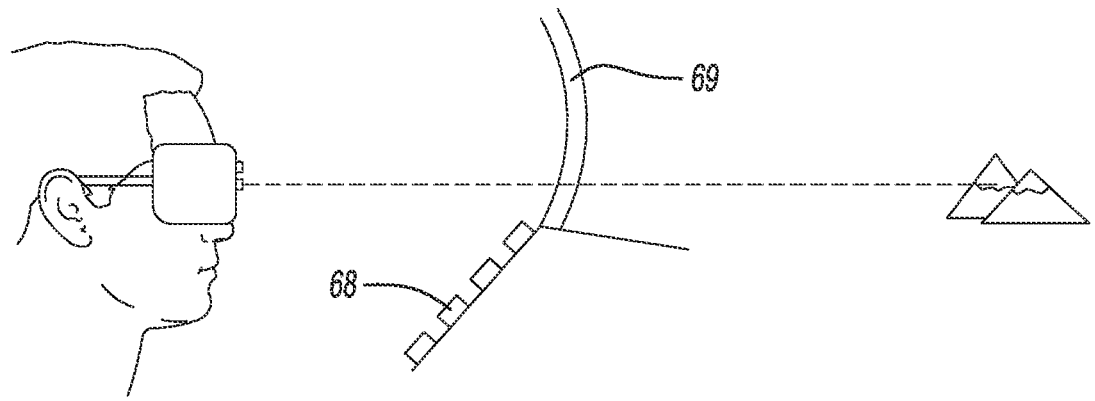

Two (2) forward-looking high-definition RGB cameras 24 are used for creating a video see-through MR imagery. The cameras provide live view of actual surroundings while also permitting video recording and MR tracking of marker-less landmarks. Whereas conventional MR displays are typically designed to function only within close-range views such as a small room, the MR-IFR cameras and their variations are to provide for both near- and far-vision; thereby facilitating alternating views between the aircraft interior and far-off objects seen through cabin windows. The MR-IFR concept introduces the use of additional sets of physical lenses or high-speed auto-focusing lenses to provide rapid and reliable transition from near- to far-sight views. In one variation as shown in FIG. 7A, multiple lenses 66 corresponding to different focal lengths are placed near each other to minimize variation in 3D perspective viewpoint between cameras. Another variation as shown in FIG. 7B shows is an example of how multiple lenses can be mechanically cycled to rapidly adjust focus between nearby and distant targets (such as between an instrument gauge and a distant mountain range). In this case the lenses can be embedded into a rotating "barrel" 67 that rapidly switches cameras without any change to the user's 3D perspective. Two (2) subsystems are utilized to determine which lenses (near- or far-view) to use at any point in time:
 a) Use of the forward-looking time-of-flight (ToF) depth camera 26 of the basic embodiment, where continuous measurement of the distance of the objects directly in front of the user at any given moment is used to indicate the appropriate focal length lens selection (illustrated in FIGS. 8A and 8B); and
 b) Gaze-tracking capability (as described in accordance with some embodiments) where the gaze direction is measured directly from monitoring and detecting changes in the user's pupils.

Figure 9:
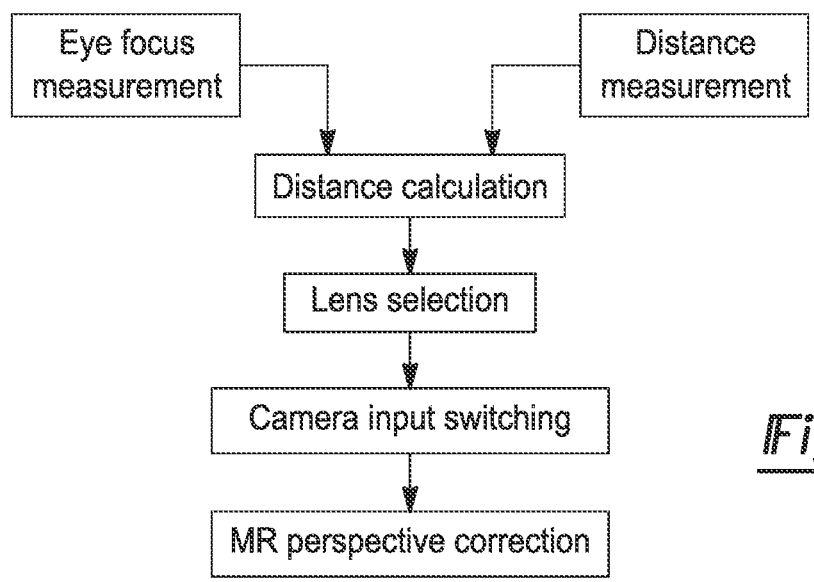
FIG. 9 illustrates a flow diagram describing methodology for implementing adaptive focus capability to MR-visor headset see-through cameras.

FIG. 9 provides a flow diagram that describes associated methodology for achieving adaptive focus capability with the MR-IFR visor for both forward-looking ToF and gaze tracking cases. Sight target information from either source is used to generate a corresponding distance calculation that forms the basis of determining lens or focus selection and subsequent image processing. This flow is accomplished via control software that seamlessly integrates actual interior and exterior views with desired overlays of MR content.

Figure 10:
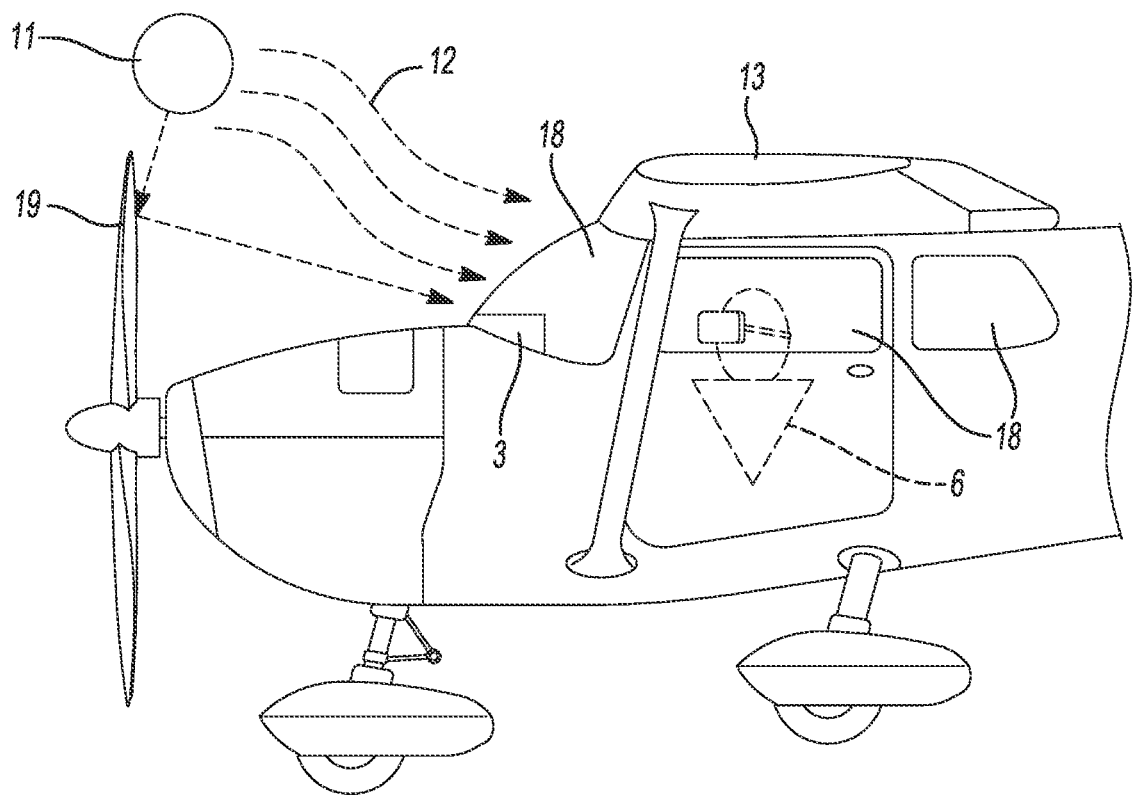
FIG. 10 illustrates a cross-section view of a small fixed-wing aircraft forward section showing relative locations of user and environmental lighting effects.
Figure 11:
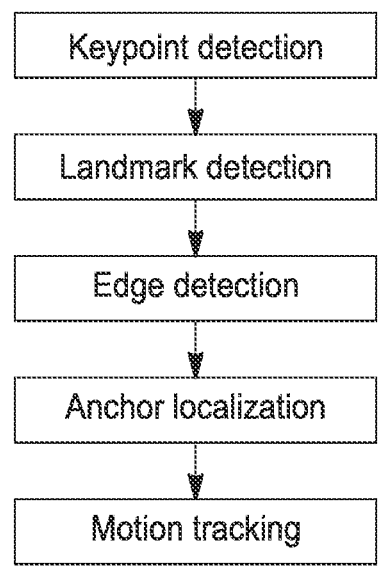
FIG. 11 illustrates a methodology flow diagram for tracking and pattern recognition of viewed objects.

A light sensor array 25 facing forward and to the sides of the headset allows measurement of luminous intensity of the natural light surrounding the user. Specifically, this sensor array provides detection and tracking of:
a) the main light source, whether it be natural sunlight, internal lighting or other lighting, its relative direction and the brightness as perceived by the user's eyes; and
b) isolation and designation of external light energy entering via the aircraft's windshield, cabin windows, or other exposures to the aircraft exterior from the cockpit view FIG. 10 provides a cross-section view of a small fixed-wing aircraft forward section showing relative locations of user and environmental lighting effects. The pilot/user 6 is shown seated in the cockpit area of a small fixed-wing single-engine aircraft 13 such as a Cessna 172 wearing said MR-visor 7 invention. Light energy 12 such as from the sun 11 radiates through the windows 18 of the cabin to light the interior of the cabin as well as illuminating exterior objects via reflected light from the sun or other energy sources. The MR-visor 7 incorporates built-in light energy sensors distributed in the forward and lateral sections of the headset such that a sufficient degree of image resolution data describing interior and exterior lighting is generated and provided to the computing vision system of the MR-visor 7. This image data is utilized to distinguish visual reference regions for interior elements such as the instrument panel 3 from those visible through cabin window areas 18 such the nose-mounted propeller 19 ahead of the aircraft cabin as well as all exterior views to the environment 5. Such pattern recognition can provide easier and more reliable definition of MR-overlay areas compared with conventional set up and programming techniques that rely heavily on mechanical reference and adjustment hardware.

Natural lighting intensity and distribution both for the interior and exterior of the aircraft can vary significantly over the course of a flight as weather conditions and relative position of the sun change over time and location. The present disclosure introduces MR hardware and an associated methodology that is akin to radio signal modulation in order to achieve accurate, consistent, and stable fixation of visible and obstructed regions desired by the IFR pilot trainee. For example, the primary measures in radio receivers are gain, selectivity, sensitivity, and stability. In similar fashion, the invention can provide user parameters and software settings that utilize similar parameters to easily set and maintain the desired boundaries between viewable and unviewable areas provided by the MR-visor headset. Gain describes the amount of amplification a signal may require in order to be properly registered by a receiver or sensor. Adjusting gain may assist in defining an aircraft cabin's window areas by strengthening the signal from low-light external environmental conditions during such times as sunrise or when the sky is overcast. Selectivity is the ability to filter out certain frequencies of energy so that the receiver or sensor can tune in to a particular bandwidth of electromagnetic energy. Adjusting selectivity can assist in distinguishing outside natural light from interior lighting sources by tuning in to specific wavelengths that are not shared with interior artificial aircraft lighting. In this way, light sensors on the MR-visor can more easily distinguish interior and exterior views of the cabin. Relatedly, sensitivity is the ability for the receiving hardware or detectors to distinguish true signals from naturally occurring background noise. Users of the MR-visor can set the sensitivity level of detectors to assist in defining visibility boundaries as well. For example, nighttime or other low-light conditions may require users to increase the sensitivity of visor-mounted sensors in order to provide sufficient signal contrast for detecting the interior areas of the cabin. Finally, stability describes how well the desired signal is maintained over the duration of use. For embodiments of the present disclosure, stability translates to how well the MR-visor maintains the original visibility boundaries set by the user as external conditions such as lighting, head position, aircraft position, and acceleration forces change over time. Such hardware is to utilize manual user input settings, software-based control, and optional software settings to easily and efficiently set and automatically maintain signal-to-noise ratios required for fixing the desired visibility boundaries. The MR-visor hardware includes detectors or sensors that feed signal read data to a computing unit that may reside on the headset or a nearby console. Software may also be designed to fix window overlay areas based only on initial user settings.

With reference to FIGS. 6, 11, 12A, 12B, and 13, by combining the measurements from the light sensor array 25, computer vision-based edge detection algorithms, natural feature detection algorithms, and SLAM algorithms are used for defining and continuous tracking of the cockpit window area, particularly the edges of the windows, regardless of the user's head position or aircraft orientation. Rapid and consistent tracking of exterior view areas is achieved with the software flow shown in FIG. 11 which is comprised of keypoint detection, landmark detection, edge detection, and anchor localization functions. This methodology differs from conventional SLAM-based approaches by implementing advanced machine learning algorithms that utilizes light sensor data to distinguish the cabin window areas from the cockpit interior. These stabilized and tracked exterior views become the canvas for mixed reality elements such as fog or clouds at various levels of transparency up through and including full opaqueness.

Figure 12A:
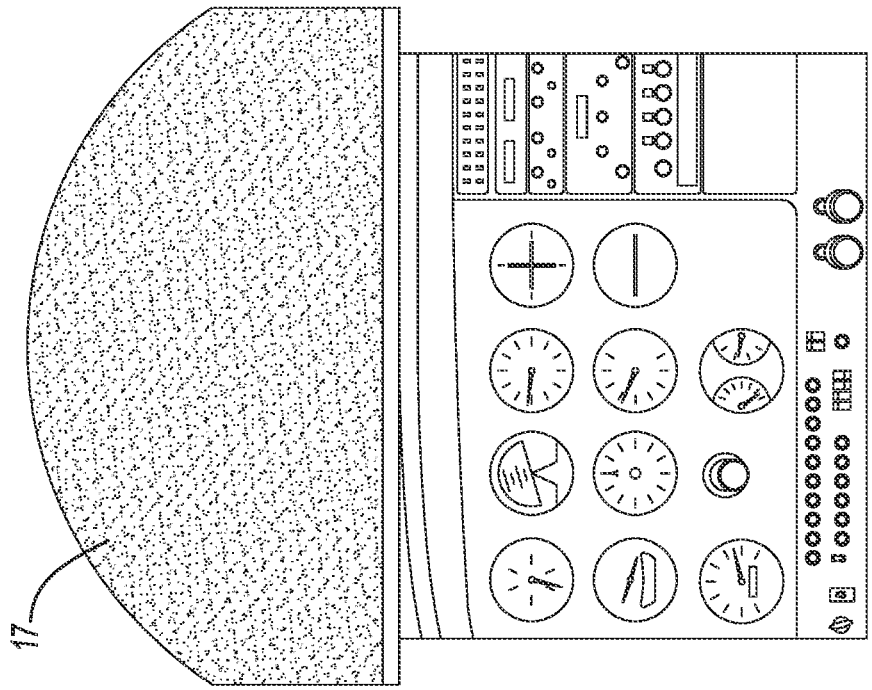
FIG. 12A illustrates an aircraft pilot's view of the interior cabin and forward exterior during Visual-Flight-Rules (VFR) conditions.
Figure 12B:
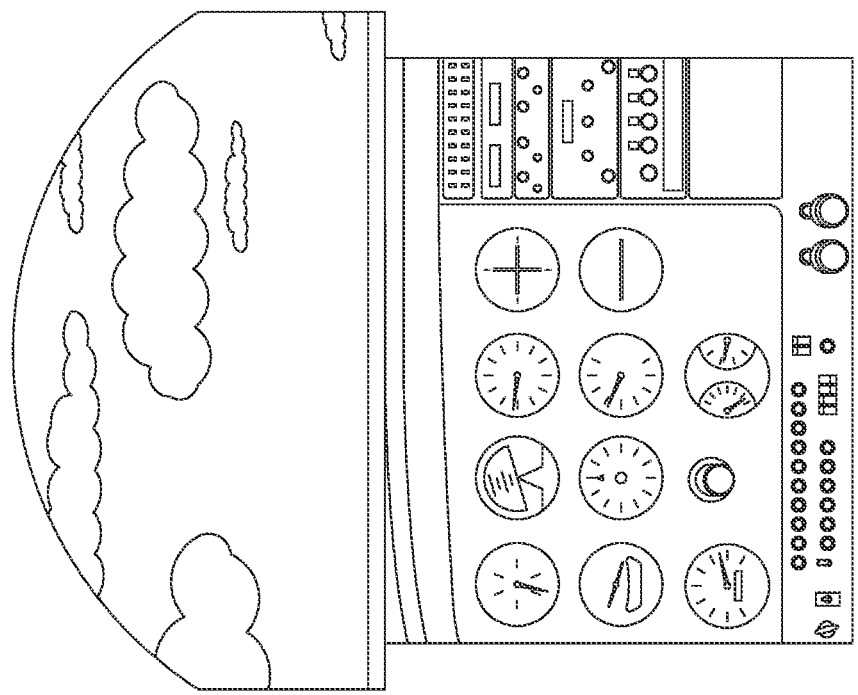
FIG. 12B illustrates the same perspective view as FIG. 12A, wherein views of regions contained by the aircraft window are modified by a computer-generated mixed-reality (MR) overlay.

FIGS. 12A and 12B illustrate a VFR cockpit view and corresponding mixed-reality IFR replication by the invention, respectively. FIG. 12A represents a pilot's view of the interior cabin and forward mounted instrument panel 3 along with an unobstructed view outside a forward cockpit window 18 during VMC. FIG. 12B illustrates the same perspective view by a user of the MR-visor where the regions contained by the aircraft window 18 regions are now obstructed or modified by a computer-generated overlay 17 by the MR-headset. This MR overlay 17 visual pattern(s) can be designed and varied as desired by the user. For example, the flight instructor may adjust the transparency of this overlay 17 area in order to simulate gradual transition from VFR to IFR conditions. In other cases, the instructor may abruptly convert from VFR to IFR to simulate inadvertent flight into clouds. Furthermore, the overlay area can be programmed to replicate certain external lighting effects, such as partial view of ground lighting in order to produce optical illusions that exacerbate pilot spatial disorientation. Such exercises can help reinforce reliance on aircraft instruments in the presence of conflicting physiological sensory inputs, which is a central challenge to IFR flight. The present disclosure permits the user to always wear the MR-visor so that a host of IFR encounter situations can be replicated during flight.

Figure 13:
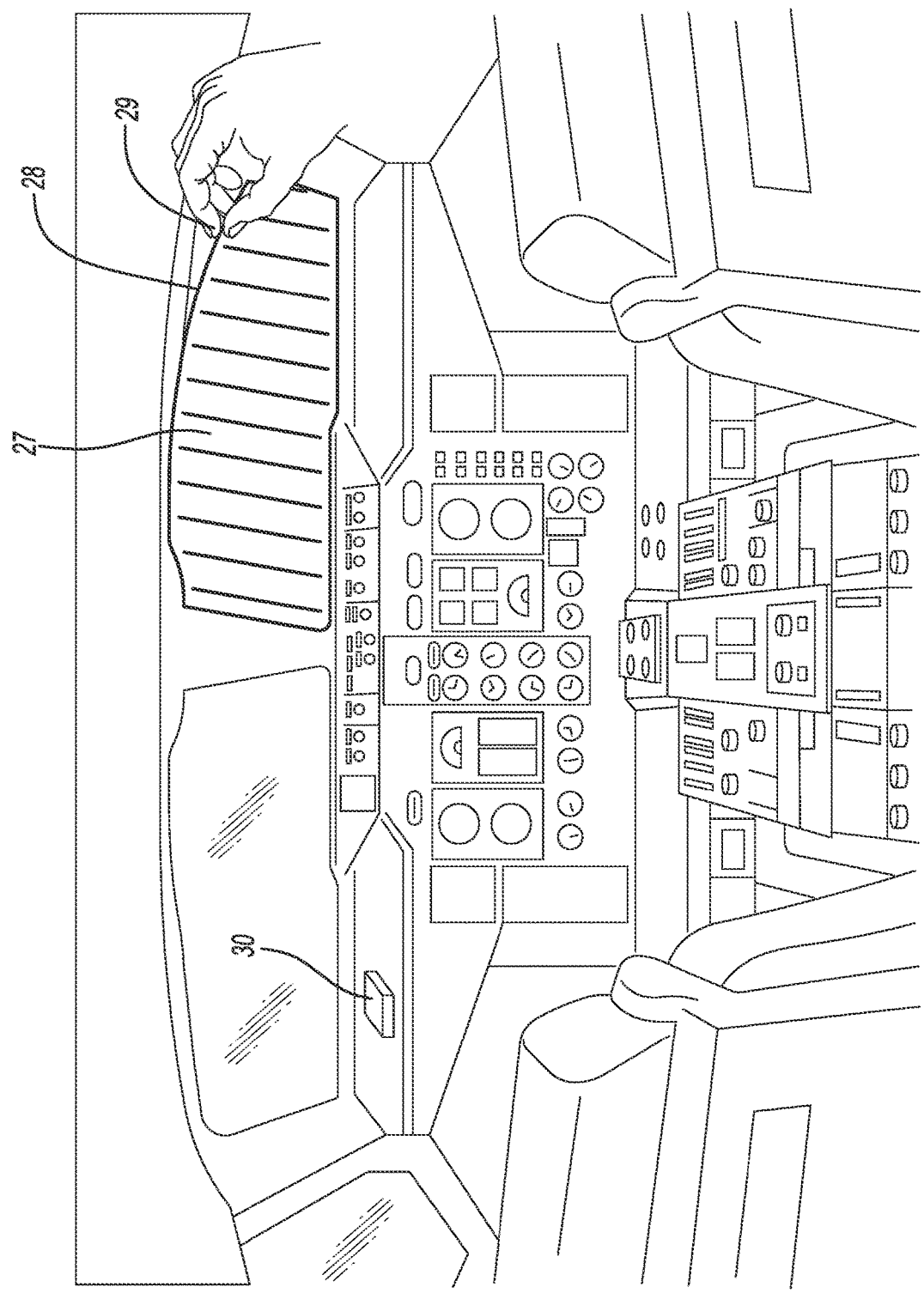
FIG. 13 illustrates a window overlay graphics region being adjusted by user hand-gestures sensed and tracked by the MR-visor headset of the present disclosure.
Figure 14:
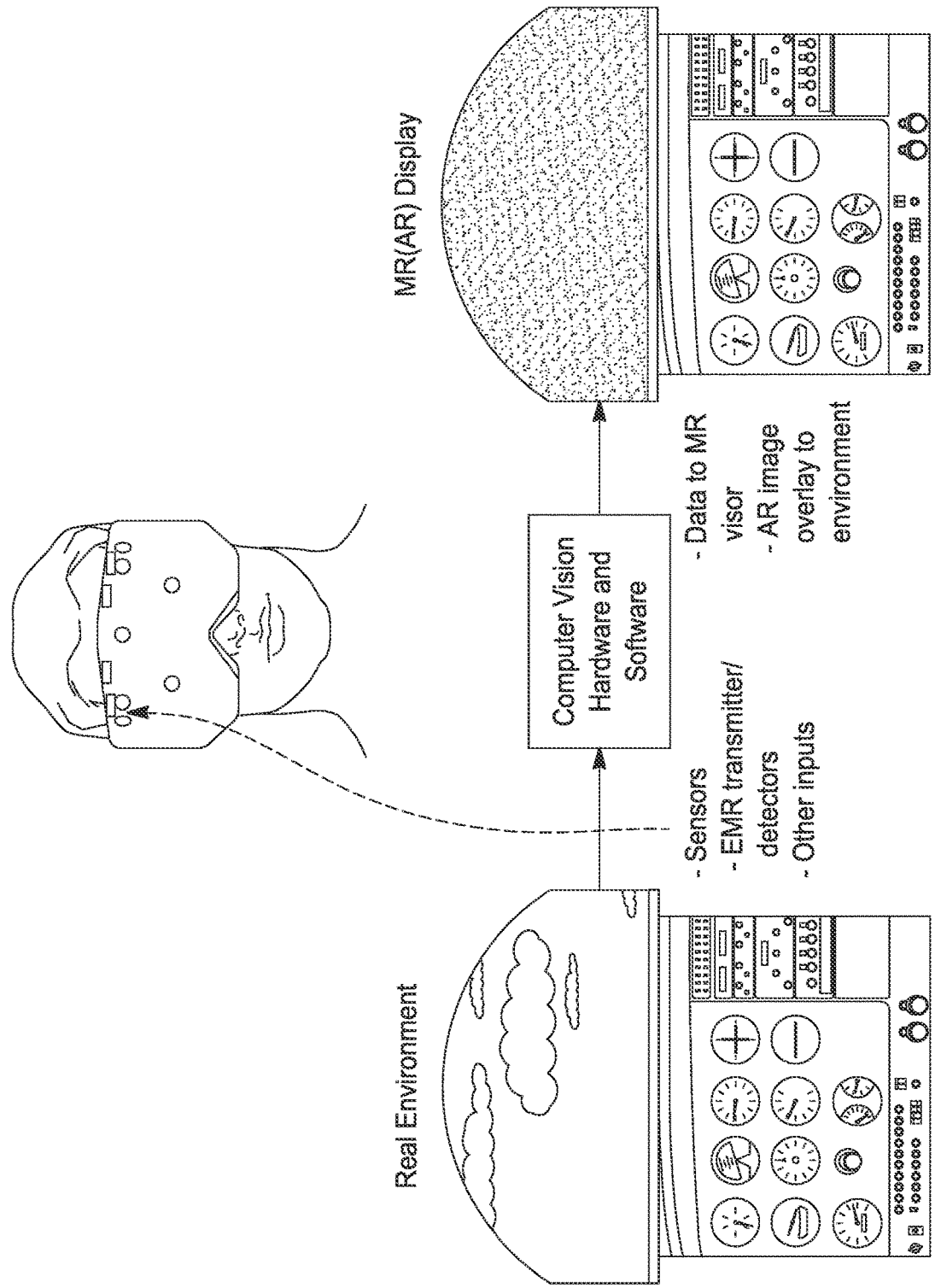
FIG. 14 illustrates data input and output to a computer vision hardware and software controller generating overlay graphics for the MR-visor headset of the present disclosure.

FIG. 14 describes data input and output of the computer vision hardware and software controlling mixed-reality elements of the invented MR-visor. As shown, inputs from the external environment can be obtained by means including but not limited to light energy sensors or detectors, supplemental energy emitters, gyroscopic sensors, and/or other energy and motion sensors. These peripherals may occur on the surface of, within or outside the MR-visor headset itself. The external sense data is fed to the computing vision hardware which utilizes optimized operating software to achieve the desired window overlay 17 area. Computing hardware typically comprising a central processing unit(s) and memory devices may also reside onboard and/or external to the MR-visor headset. Some embodiments may incorporate an accompanying handheld console in order to minimize size and weight of the head-mounted unit. Such console may include a separate display that allows observers such as flight instructors to view the augmented reality being experienced by the user in real-time. Most embodiments are likely to include a graphic user interface where parameters and functions can be set by the user. For example, window overlay regions may be adjusted by hand gestures by the user as depicted in FIG. 13. In some embodiments, wired or wireless connections to alternative peripherals such as a smartphone may be used to permit interface with the unit. The computer vision hardware takes the external input signal data and processes it to maintain a fixed augmented overlay area 17 that can be adjusted for visual transparency and other parameters at any point during use.

Figure 15:
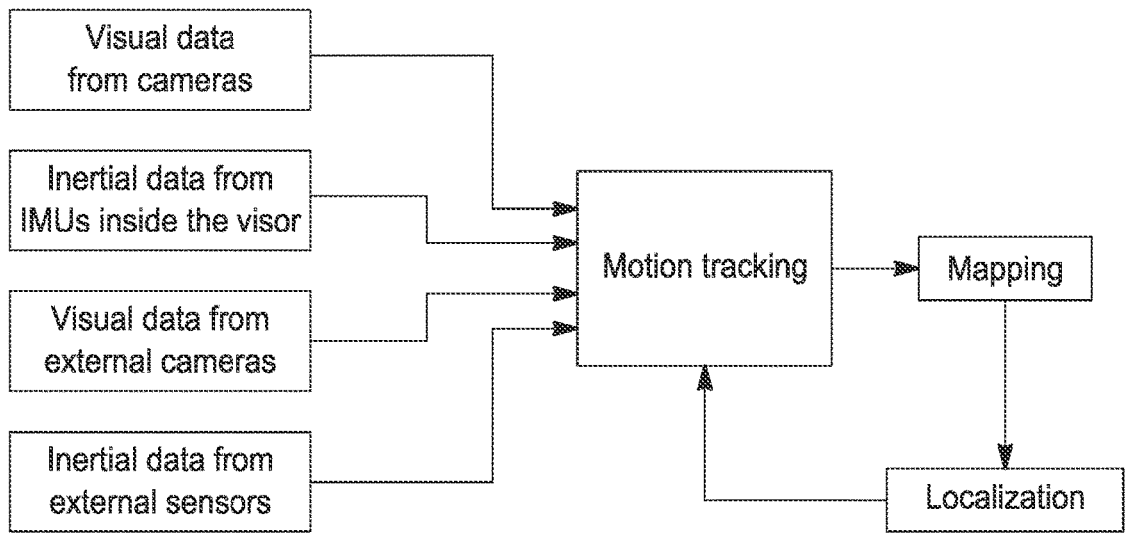
FIG. 15 illustrates a methodology flow diagram for initialization and calibration set up for mixed-reality image overlay.

Additionally, a computer vision-based hand-tracking algorithm that utilizes a close-range depth camera 26 can track the user's hand in real-time which allows calibration steps to be conducted without any programming or additional hardware. Before the operation, the system is calibrated by manual steps as illustrated in FIGS. 13 and 15:
 a) The user gazes forward at the windshield and initiates the calibration process; and
 b) The light sensor data and computer vision algorithms determine the cockpit window area 27 by creating anchor points to the corners of each window that are then tracked continuously.

In case automatic detection fails or some of the edges of the window area 28 are not detected correctly, the user can "draw" window edges by using a point and pinch gestures 29 recognized by the system's hand-tracking algorithm. The calibration steps are repeated for each window surface in the cockpit. After the process is completed, the system maintains the position of the anchors which in turn allows MR content to be shown instead of the actual view seen through the windows. The system allows accurate and stable tracking of the cockpit window area so that digital imagery appears to replace the real environment outside the plane normally seen through the windshield and windows of the aircraft. Thus, IFR training scenarios that may include clouds, rain, snow, birds, other aircraft, and variable lighting effects (for instance strobe lights) can be generated via the headset's display. Computer-vision imagery may be turned off at any time to grant the user full view of actual surroundings via the MR-visor's see-through cameras.

Once the calibration is completed, stable tracking (ie: anchors remain superimposed over only the cockpit window areas) is achieved by combining the visual data (camera image) as well as the inertial data from the sensors inside the headset and inertial data from an optional external gyro sensor 30.

The combination of these sensor data enables stable tracking even during extreme lighting and motion conditions. For example, conventional tracking may not be capable of keeping up with a combined scenario consisting of:
 a) bright sunlight directly facing the camera (RGB image white-out);
 b) aircraft turning or rotating; and
 c) and/or the pilot user's head is turning.

In such case, typical hardware and software methods cannot maintain a proper fix on the defined window areas as at least one of the data sources (such as the RGB camera) is momentarily compromised. In contrast, as described in the proposed process flow (FIGS. 11 and 15), combining data from the headset with an external sensor that tracks and communicates aircraft orientation assists in differentiating the pilot's movement from the movement of the aircraft in flight. Furthermore, the external gyro sensor may facilitate stabilized tracking in advanced training scenarios where unusual and/or abrupt movements are required from the pilot and aircraft.

Figure 16:
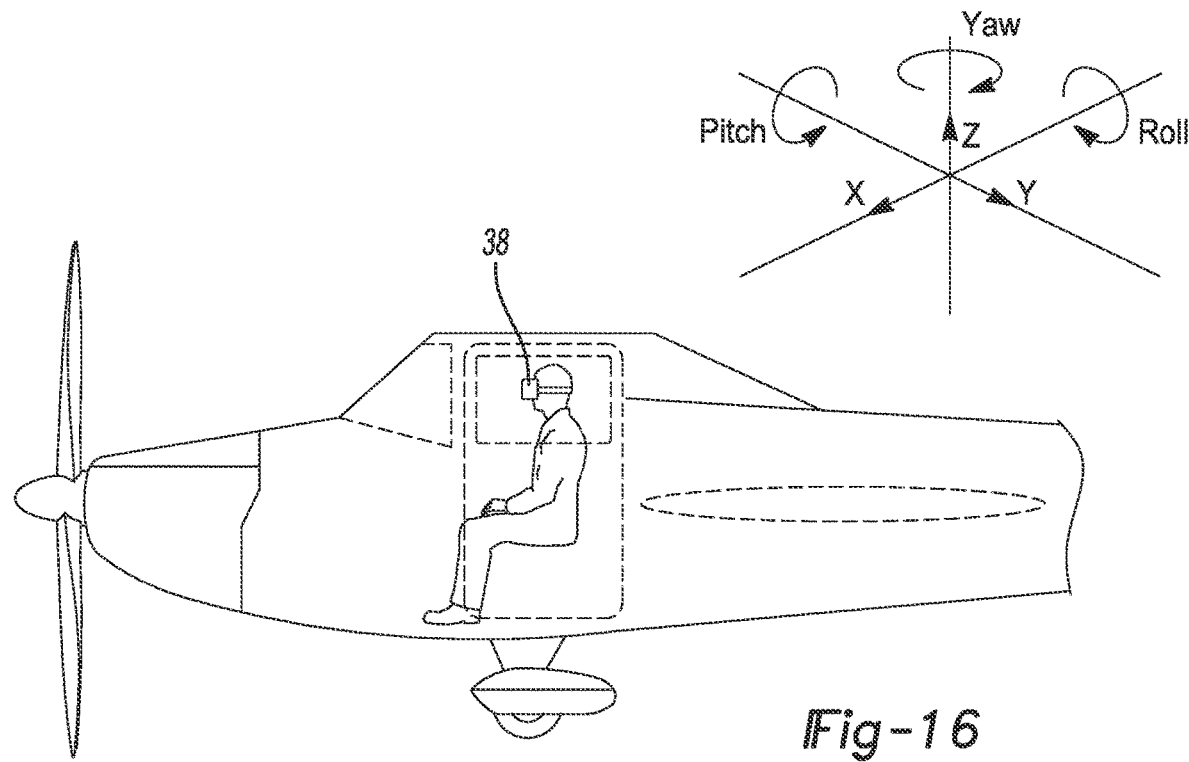
FIG. 16 illustrates the freedom of movement provided by MR-visor headset of the present disclosure.

As represented in FIG. 16, the sensor fusion-based positional tracking allows the pilot to turn his or her head in any direction and move within the cockpit without causing the simulated MR imagery 38 to lose its localization. The digital image seen by the pilot appears seamless while allowing 6 degrees of freedom (DoF) on the horizontal axes X and Y, the vertical axis Z, as well as yaw, pitch, and roll axes. The digital MR overlays displayed over real-world views consisting of the cockpit and the exterior of the aircraft allow various scenarios to be created for IFR pilot training. The overlays can be ambient (like physical VLDs) or momentary as in computer simulations, games, and other applications.

Figure 17:
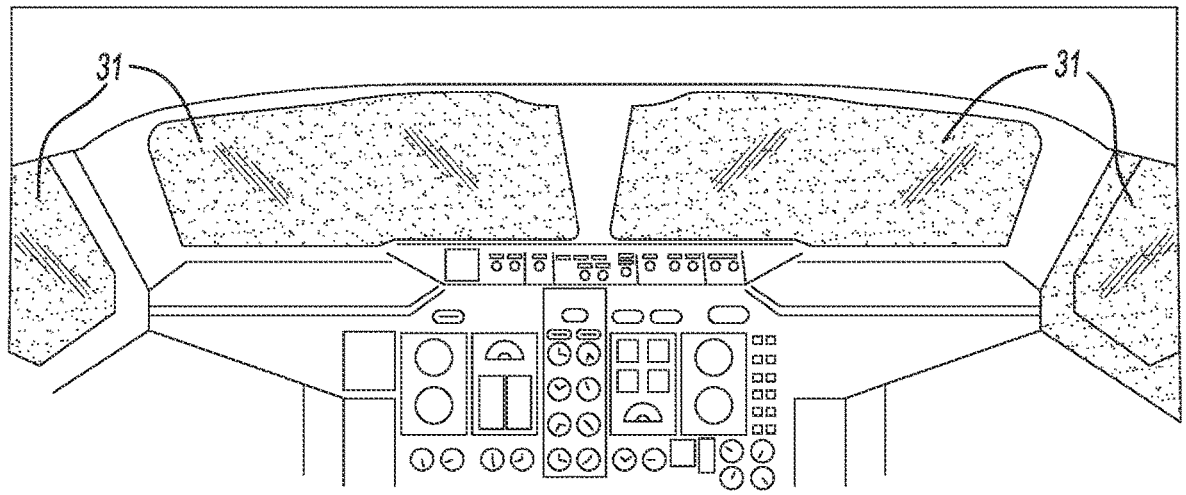
FIG. 17 illustrates pattern-recognized overlay regions corresponding to an aircraft's windows upon which mixed-reality graphics can be superimposed to the user's perspective.
Figure 18:
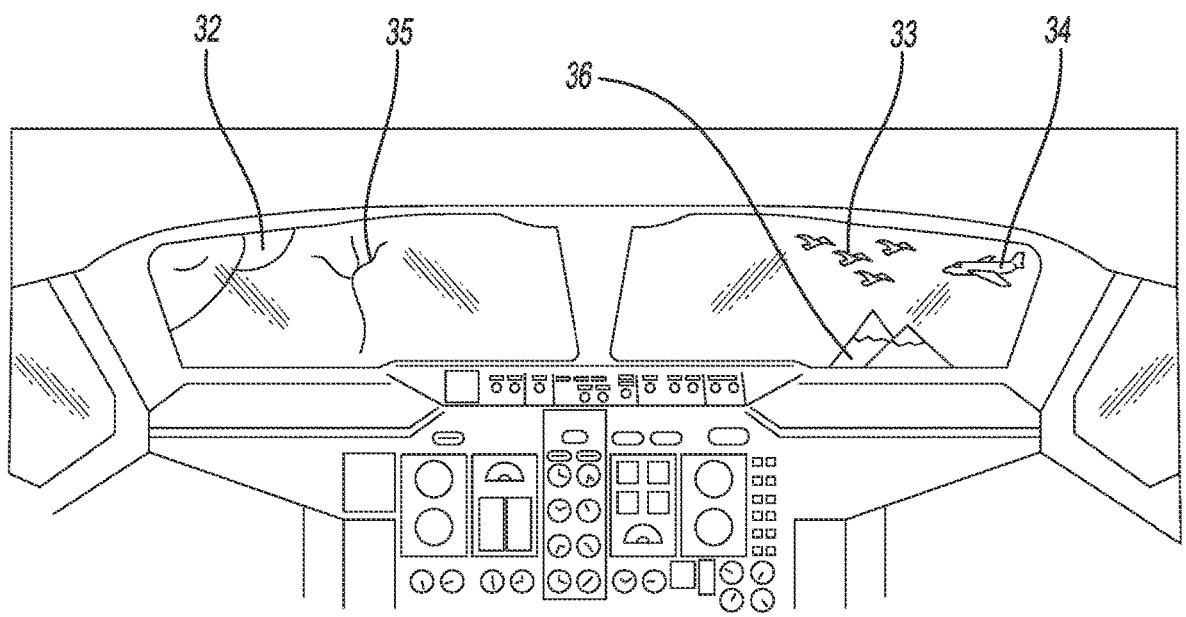
FIG. 18 illustrates an exemplary overlayed graphics of external objects that can be generated by the mixed-reality controller of the present disclosure within the exterior view regions of an aircraft cockpit.
Figure 19:
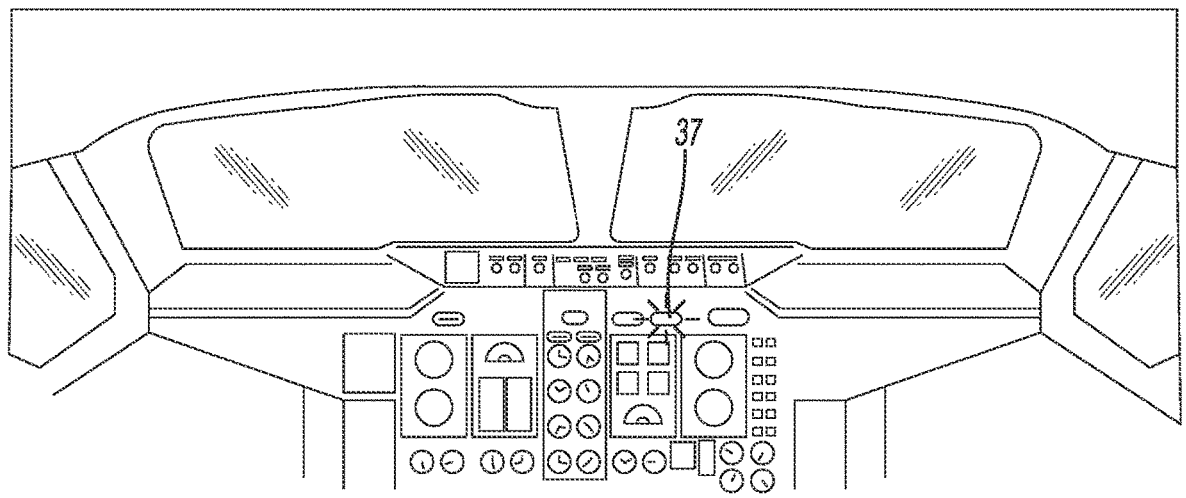
FIG. 19 illustrates an example overlayed graphics of features that can be generated by the mixed-reality controller of the present disclosure within the interior view regions of an aircraft cockpit.

FIG. 17 illustrates ambient overlays that may include weather-related conditions where full or partial views may occur including but not limited to: complete darkness of night operations, opaque overlays that cover all window areas 31, variable densities of fog, clouds, rain, or snow, or very bright light such as when flying into direct sunlight. FIG. 18 illustrates momentary dynamic overlays that may include but are not limited to passing cloud formations 32, moving bird flocks 33, other aircraft/traffic 34, cracks on the windshield 35, as well as lightning, heater plate view patterns during icing conditions, or smoke from the engine. Imagery simulating stationary objects such as high-rise buildings, mountains 36, etc. may also be generated. Additionally, as shown in FIG. 19, MR content may include modifications to the readings the flight instruments display, for instance, alarm lights in the instrument panel 37 indicating engine failure or other unexpected technical problems which can be controlled by the flight instructor.

Compared to the prior art, particularly mechanical VLDs, the MR-IFR visor offers several kinds of significant improvements to in-situ flight training:
 a) MR-IFR eliminates the possibility of peeking over or under the visor or from the side as long as the visor is worn by the pilot. The only way for the pilot to avoid seeing the simulated AR content (i.e., "cheat") is obvious removal of the visor. This ensures each pilot experiences the same simulated flight conditions the instructor exposes them to.
 b) By allowing more free and natural head movement, the MR-visor invention permits trainees to more accurately experience the disorienting effects of IFR flight. Such firsthand experience is a vital component in better preparing pilots for challenging IFR flight scenarios.

c) The MR overlays allow more variation and a much richer presentation of flight-related events than any existing VLD as virtually any kind of MR overlay can be produced digitally for the pilot to experience. All imaginable lighting conditions, as well as surprising events, can be created and presented as an MR overlay. The MR overlays can be controlled in-situ by the flight instructor which allows dynamic events to be simulated as per the instructor's judgment of what the pilot should be able to handle in each training session.

d) The sensor fusion-based positional tracking approach allows the pilot to move naturally inside the cockpit as in any normal flight situation without disruption of the illusion produced by the simulated scenarios shown through the MR-IFR visor.

In some embodiments, the invention may additionally incorporate a novel arrangement of electromagnetic emitter(s) and receiver(s) in and around the aircraft structure and MR-visor 7 that provide supplemental data to the computer-controlled vision to enable more accurate and consistent distinction between internal and external views from the cockpit. These additional emitter/receiver combinations permit significantly simplified user set up and operation under the highly variable conditions of actual flight training.

Figure 20:
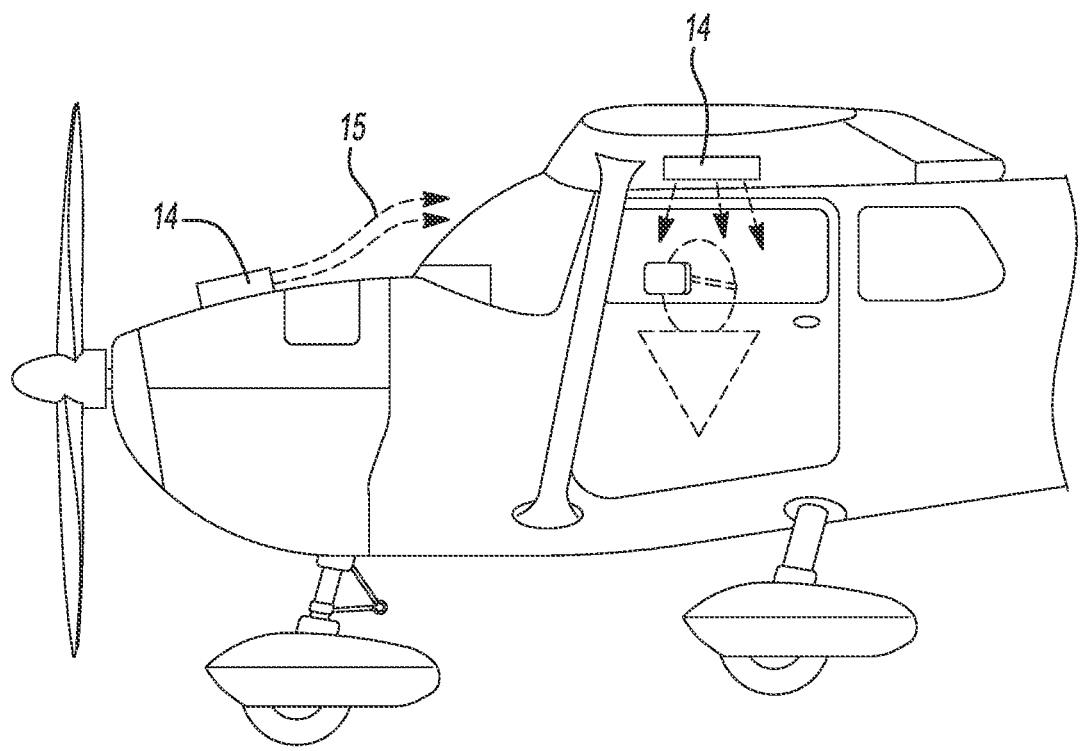
FIG. 20 illustrates electromagnetic energy emitters affixed to an aircraft exterior providing supplemental location data inputs to the MR-visor headset controller.

FIG. 20 illustrates incorporating said electromagnetic energy sources such as infra-red (IR) light emitters affixed to certain points of the aircraft exterior in order to supplement environmental data inputs to the MR-visor hardware. For example, infra-red (IR) light emitters of a specific frequency can be attached to the forward nose and lateral wing areas such that they provide a consistent radiation source which can be referenced by corresponding receivers within the MR-visor system. IR or other electromagnetic energy wavelength would be selected to permit transmission only through the cabin window 18 areas thereby providing a consistent signal to corresponding receivers inside the aircraft that define the exterior window areas, irrespective of varying natural ambient lighting conditions. In this way, computer vision software can be simplified by not having to make as many adjustments for varying external lighting conditions.

Figure 21:
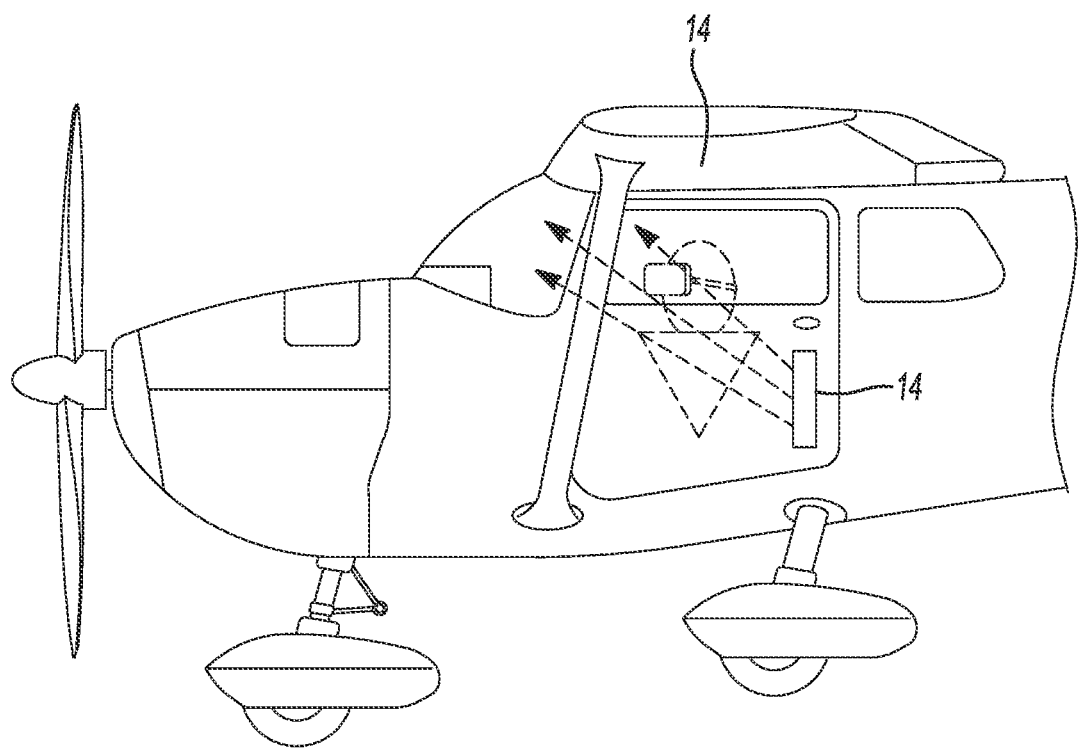
FIG. 21 illustrates electromagnetic energy emitters affixed to the backside of an aircraft interior providing supplemental location data to the MR-visor headset controller.

FIGS. 21, 22 and 23 show additional variations that can be used independently or in combination with some embodiments where an electromagnetic energy emitter is located inside the cockpit mounted onto ceiling 52 or the backside of cockpit 53. In such a case, emitter and receiver wavelength settings can be selected such that energy reflected from the cabin windows 18 is utilized to help maintain a more stable sensor data definition of the exterior views from the cockpit. FIG. 24 illustrates a registration device(s) 54 which can be affixed to locations inside the cockpit such as the top of the instrument panel. Said device 54 can be used to provide reference positional data to the computer vision hardware through radio, electromagnetic energy, or other means in order to assist in maintaining a stable definition of the instrument panel location and interior regions of the aircraft irrespective of ambient lighting conditions. The elements provided in FIGS. 20 through 24 may be used separately or in any combination to enable consistency, stability, and ease of use of the MR localization function as well as positional tracking capabilities of the MR-IFR visor 38.

FIG. 25 shows another variant of the MR-IFR visor that contains an additional long-range (several meters) IR light emitter 46 and receiver 47 on the headset which constitutes a time-of-flight (ToF) stereo camera. The ToF camera measures the distance of objects in front of it thus producing a three-dimensional depth image. The depth image in this case is used to provide accurate measurements of the relative location of the flight instruments to the MR-IFR visor. Together with another such stereo camera 48 mounted in the cockpit facing the flight instruments shown in FIG. 26, the absolute position of the flight instruments can be tracked in real-time with a high level of reliability and stability. This camera 48 is fixed to a stationary position and assists in creating a continuous three-dimensional image of the aircraft's interiors for identifying and tracking the flight instruments. It acts as the ground truth reference image against which the stereo camera mounted on the visor is compared.

The visual data coming from the visor as well as from the external sensors would consist of a three-dimensional (3D) point-cloud. The 3D image from the stationary ToF camera is correlated with the 3D image from the stereo camera in the visor which allows object-tracking of the instruments to be stable regardless of lighting conditions inside the cockpit. The point-cloud represents the physical shape of the cockpit dashboard and flight instruments rather than the respective color image in which readings and numbers would dynamically change. Thus, the reliability and stability of tracking the flight instruments' position and window areas can be higher than with purely RGB-camera-based approaches.

FIG. 27 illustrates a 3D image created by the stationary stereo ToF camera mounted in the middle of the cockpit which contains parts of the windshield and the instrument panel. The inside corner between the windshield and the instrument panel 49 and a part of the panel elevated from the rest 50 are unique features with edges in the 3D point-cloud. A similar image seen from the pilot's perspective captured by the ToF camera on the visor would be recognized as the same partial image which helps in localizing the MR content under variable and suddenly changing lighting conditions.

In some embodiments, the MR-IFR visor may employ gaze-tracking technology that can be useful in gathering data concerning the user's observation pattern during training exercises. FIG. 28 shows an MR-IFR visor that contains inward-facing cameras for the right eye 56 and the left eye 57 that track the pupil of the user's eyes. Computer vision methods enable rapid and precise tracking of the eye movement for identifying the location and duration of the user's gaze (often called "dwell time"). For example, the gaze-tracking data can be used to analyze whether the trainee is fixating view on a particular instrument versus running the recommended comprehensive instrument scan. Instrument fixation, a common issue with IFR pilot trainees, could be more quickly identified and addressed by the instructor using gaze information. The data can even be superimposed onto the video-recorded view produced by the RGB camera 24. The system records the trail of the user's gaze consisting of time-series of the fixation points. The analysis can indicate for instance, that the altitude was not checked by the pilot during a critical period of the flight, or if other instruments have not been looked at. Additionally, it is easy to identify when the pilot is looking back and forth between instruments and the outside environment to understand what is happening outside the aircraft.

Said gaze data can be accessed wirelessly post-flight for review and analysis as well as during the flight when the instructor sitting next to the pilot thus enabling more informed, real-time feedback. For the instructor, real-time access to the pilot's gaze trail is a novel tool for teaching and becomes particularly useful when the system assesses adherence to common teaching principles (such as "spend most time monitoring attitude indicator") are quantified and measured automatically. FIG. 29 illustrates a corresponding process flow methodology where an additional setup process of creating instant tracking of multiple Areas of Interest (AOI) is introduced to quantify where the pilot is looking. The AOI can be individual flight instruments 58 or other parts of the cockpit such as the windshield 59. Instant tracking techniques are used to create image targets of AOIs, such as the attitude indicator, the heading indicator, the turn indicator, etc. By completing the setup process, the instructor can view automatically gathered statistics about the pilot's gaze trail and the time spent looking at each flight instrument, and the sequence of gazing at each instrument. The AOI setup process uses both common and scenario-specific settings. Thus, an instructor's workload in observing the pilot is reduced while training effectiveness is increased.

Extending on eye-monitoring utility, another variant of the MR-IFR visor may contain similar inward-facing cameras for the right eye 56 and the left eye 57 that track additional metrics from a user's eyes such as changes in pupil diameter, blinks, saccades, and perceptual span. Such metrics can help assess the cognitive load on the pilot in terms of visual attention, alertness, fatigue, and confusion. This supplemental eye-tracking data may help the flight instructor better understand the level of difficulty experienced by the trainee during any exercise. With eye-tracking data available in real-time, the instructor is also able to quantify if deliberate interventions created artificially in the training scenario produce the intended effect on the pilot. Example of such interventions can include sudden blinding lights from simulated sun, lightning, or strobe lights, or other MR imagery simulating clouds, rain, birds, or aircraft traffic. Eye-tracking data can therefore help quantify the individual limits of cognitive overload for pilot thereby allowing difficulty level to be optimized for each training session.

In some aspects of the present disclosure, the MR-IFR visor may employ face-tracking technology to accumulate more data on user feedback. FIG. 30 illustrates multiple RGB video cameras 60 that capture the pilot's facial expression from the inside of the visor in the area of the eyes and the mouth. The video image is captured in real-time and subjected to face detection, feature detection, and feature classification to recognize the facial expression of the pilot. These face-tracking methods facilitate real-time estimation of the pilot's emotional state, including indications of confusion and/or cognitive overload which can help optimize Mental Readiness Training (MRT). Facial expression analysis methods are used to detect adverse feelings such as fear, anger, and surprise in the context of piloting an aircraft. Therefore, face-tracking capabilities help in assessing the emotional reaction of the pilot in simulated events in terms of key factors including but not limited to:

a) Relevance: how the event relates to the objectives of the pilot's current flight mission.
b) Implications: the impact on the event on the pilot's short and flight mission goals.
c) Coping potential: how the pilot manages to deal with the event in relation to the goals.
d) Significance: how compatible or incompatible the event is in terms of a known set of rules or regulations.

These factors relate to the pilot's attention, memory, motivation, reasoning, and self-awareness. Face-tracking acts as a tool for the instructor to use in obtaining objective assessment of the pilot's experiences which can be used for optimizing the training session in terms of difficulty and current capabilities of the pilot.

According to various aspects of the present disclosure, the MR-IFR visor may include additional physiological measurement devices for the user/trainee. For example, FIG. 31 illustrates a set of sensors embedded in the visor that track the physiological changes of the user. Shown are three (3) different sets of sensors used for indicating stress levels and emotional responses of the user. These sensors are embedded on the inside headband of the visor head where they are in contact with the user's skin. First, a heart rate sensor 61 is used to measure the pulse of the user from the forehead. The pilot's heart rate can tell the instructor if the pilot is expressing sudden anxiety caused by a simulated event in the training session such as inadvertent flight into dense clouds. Changes in the heart rate measured as the heart rate variability (HRV) reveal stressful moments experienced by the pilot.

Second, electroencephalogram (EEG) sensors 62 record the electrical activity of the user's brain during the flight. EEG data recorded and shown to the instructor in real-time helps in verifying reaction times and other cognitive behavior. EEG can quantify various training situations and indicate whether the pilot's reaction time is normal given any training scenario. EEG can also indicate the level of cognitive load experienced by the pilot which is typically measured post-flight with well-established questionnaires such as the NASA Task Load Index (NASA-TLX). By making this EEG measurement available to the instructor in real-time, the complexity of the training session can be adjusted in-flight for each pilot trainee according to skill level.

Finally, Galvanic Skin Response (GSR) sensors 63 can be used for recording the change in the electrodermal activity in the user's skin due to sweating. GSR reveals can provide more useful real-time biofeedback information on the pilot-trainee. As skin conductance is not under the voluntary control of a human being, it can reveal nervousness on the part of the trainee, even in cases where the subject may deliberately be attempting to hide emotional responses from the instructor for any reason.

Another optional feature for the MR-IFR visor is an embedded surround sound audio system. FIG. 32 illustrates the MR-IFR with surround audio speakers 64 that allow sound effects to be added to the immersive experience of the simulated scenarios shown on the visor's display. Sound effects can be particularly useful for enhancing the realism of simulations concerning sudden and startling distractions such as: thunder, impact with birds or airborne debris, engine failures, instrument audible alarms, and radio communications with air traffic control (ATC). Said surround audio speakers can provide directional control so that sounds appear to emanate from specific sources (such as from the windshield during a bird strike).

According to yet additional aspects of the present disclosure, the MR-IFR visor may include a programmable Global Positioning System (GPS) tracking feature. A GPS-based tracking device 65 embedded into the visor shown in FIG. 33 allows location-based scenarios to take place during the training flight automatically. As the position data consists of latitude, longitude, as well as altitude, various simulated additions can be introduced to the training scenario experienced by the pilot trainee. While the aircraft operates inside a pre-defined geographical area, various effects are triggered by the system as a function of position, without any action required from the instructor. This feature allows the user to pre-program typical adverse weather conditions for a given region in order to replicate such conditions for the trainee via the MR-IFR visor. For example, coastal regions often exhibit marine layer fog or cloud cover due to the inward movement of moist air from the ocean into adjacent land masses. Weather data corresponding to the positions, altitude and airspeed of such fog or clouds can be collected and programmed into the MR-IFR so that the trainee pilot may experience the same conditions during a clear day. Benefits include gaining familiarity with real world weather patterns more quickly and efficiently.

Notably, a full virtual-reality (VR) implementation of the invention can be facilitated where all (100%) imagery supplied to the user is computer generated in synchronization with real time flight orientation data provided by GPS and/or other sensors. This approach leverages conventional flight simulation software by combining fully synthetic visuals with actual operating conditions that replicate real life scenarios such as those leading to spatial disorientation.

The MR-IFR visor may be implemented with an optical see-through display similar to augmented-reality (AR) visors in order to provide reduced hardware size, weight, and cost. Such hardware may be ideal for cases where the translucent nature of computer-generated overlay imagery applied over a see-through lens is not a critical factor. For example, certain flight training operations may be satisfied with replicating only partial obscurity of aircraft exterior views in return for reduced cost and weight of the visor system. FIG. 34 illustrates such a variant where the MR-IFR visor provides the user direct view of the surrounding environment through a transparent LCD screen; thereby eliminating the need for multiple lens cameras and other sensors. Only one forward-looking RGB camera 40 would be required for tracking landmarks in the environment using described marker-less AR tracking techniques as well as recording the user's session for post-flight review. Otherwise, this example includes basic components of a stand-alone MR headset which includes, but is not limited to, the following:

a) A Microelectromechanical Systems (MEMS) display with either holographic or diffractive extraction of light from a waveguide. Two microdisplays beam an image through a lens toward the surface of the display. The image is turned by two holograms on the way to the user's eyes: the first one turns the originating image 90 degrees from the image source and sends it down the waveguide, and the other intercepts the light rays and turns them 90 degrees toward the pupils, supporting a refresh rate of 60-120 fps for each eye at high resolution (e.g., 1920 pixels).

b) A Central Processor Unit (CPU) with additional processing units dedicated to computing motion-tracking outcomes.

c) An internal Random Access Memory (RAM) unit.

d) An embedded long-term digital storage unit.

e) A battery unit.

f) A headband.

As with the primary MR-based visor embodiment, this AR version is also comprised of various cameras and sensors for tracking the orientation and the position of the headset using the inside-out positional tracking approach using 4 head-tracking cameras—2 directed forward 41 (above right and left eyes) and 2 directed diagonally to the left side 42 and the right side 43. Each contains an IMU comprised of an accelerometer and a gyroscope. A light sensor array 44 facing forward and the sides of the headset for measuring the luminous intensity of the natural light may also be included as well as a close-range depth camera 45 for tracking the user's hand in real-time. The software concerning positional tracking, AR imagery, and calibration is also similar to the primary MR embodiment.

FIG. 35 shows a variant of the optical see-through MR(AR)-IFR visor containing additional light sources 55 that produce a bright light reflecting from the surface of the display toward the user's eyes. These light sources may be used to simulate common adverse scenarios such as exposure to direct sunlight, pulsating strobe lights, or lightning. Even momentary exposure to bright lighting may cause pilots to become temporarily blinded. Said additional light sources can produce a more realistic replication of adverse lighting conditions thereby enabling pilot trainees to become better prepared for such scenarios. MR embodiments of the present disclosure do not require these additional light sources as the display itself provides adequate brightness for simulating lighting effects.

While the present disclosure has been described in terms of potential embodiments, it is noted that the inventive concept can be applied to a variety of head-mounted VR, MR and AR designs for use in IFR flight training and other applications. For example, embodiments of the present disclosure can assist with training in handling ground vehicles and marine craft during adverse weather or lighting conditions. Furthermore, certain hardware and software embodiments may incorporate items like optimized design features or artificial intelligence. It will be apparent to those skilled in the art that various changes may be made without departing from the scope of the invention.

A computer vision based technique is proposed for a mixed reality (MR) visor based instrument flight rules (IFR) pilot training. This requires emulating a supervised flight practice scenario wherein the trainee is presented with poor visibility conditions due to clouds, fog, other adverse weather or night-time operations, in order to train them to fly the aircraft by reference to onboard instruments and sensor readings. It is thus critical that the video feed of the surrounding cockpit area, presented to the trainee pilot via the MR visor, is augmented/overlaid with emulated outdoor conditions on the windows that are well-registered with the 6 DOF pose of the MR visor in real time.

The system according to the present teachings works by exploiting the fact that an airplane cockpit is a small workspace within which the MR visor needs to operate and, as such, a 3D point cloud mapping of the workspace need only be done once. As opposed to typical robotics or AR use cases, where simultaneous localization and mapping (SLAM)—or parallel tracking and mapping (PTAM), as it is known to the AR community—must be done at frame rate in order to explore a large unknown environment, our application can safely assume that the environment is known and mapped beforehand. Subsequently, only localization of the MR visor needs to be done with respect to the pre-mapped 3D point cloud, and computationally expensive map updates need not be done frequently. The following steps are included:

1. Offline Map Building: Mapping involves building a 3D point cloud of the cockpit interior using monocular or stereo cameras integrated within the visor [1], or via sensor fusion approaches involving camera(s), LiDAR and/or inertial measurement units (IMUs) [2]. However, 3D LiDARs popular in self-driving cars can be prohibitively expensive as they typically cost upward of $10,000 for a reasonable vertical resolution (with the horizontal resolution achieved by electromechanical spinning of the LiDAR beam internally). On the other hand, optical cameras or image sensors are considerably cheaper, and visual SLAM has been shown to achieve robust and real-time performances for indoor environments [1, 3]. Insufficient lighting within the cockpit might pose challenges to optical cameras. However, instrument panel backlights can potentially present a feature-rich environment to achieve reliable SLAM. Alternatively, infrared image sensors may be used. Furthermore, a sensor fusion of cameras and IMU sensors—i.e., visual inertial SLAM—can potentially enhance the accuracy of visual SLAM alone, particularly in low-lit conditions, occlusions, poor texture, as well as increase the throughput [7, 8].

Mapping may be done in an entirely offline manner, so that speed may be traded off for accuracy. This can be done using a front-end interface on the trainer's tablet device, possibly by the trainer themselves, by moving within the scene some standalone stereoscopic camera or a sensor rig consisting of aforementioned sensors (which is pre-calibrated in the factory), thereby acquiring a one-time, fixed point-cloud 3D reconstruction of the entire cockpit. Note that a typical cockpit features instrument panels and other objects including seating, windscreen and window edges, indoor paneling, etc. This presents a highly feature rich environment for successful visual SLAM and pose estimation. Creating a complete and accurate map of a given cockpit before flight training begins has the advantage that computationally expensive and iterative algorithms such as bundle adjustment [1] need not be done at run-time.

2. Offline Segmentation of Overlay Region: The cockpit wind screen and window region needs to be precisely segmented. A naïve approach would attempt to perform said segmentation in every frame, as is typical in marker based or marker-less AR, where exploration of the environment and therefore mapping must be done as an online process. By contrast, our scenario merely requires the regions to be overlaid once with high accuracy, as long as these regions are clearly delineated within the 3D point cloud—which is a straightforward process as the point cloud is fixed and known beforehand. Additionally, a pre-segmentation as described above also helps to identify and discard any points within the 3D point cloud that arise due to any features on the windscreen and windows (except along the edges), as these happen to be due to the objects/scenery outside the airplane and thus cannot be relied upon when localizing the visor with respect to the map in step #4 (since these features change as the plane moves).

We can either use robust and invariant classical machine learning based approaches (such as CPMC [4]), or modern deep learning methods (such as Mask R-CNN [5]). This step may be done interactively using the trainer's tablet so as to achieve a precise segmentation that is well-registered with the point cloud. Furthermore, provided the processing platform (which is not necessarily embedded into the visor to keep it lightweight, and may be placed in the vicinity, or be a wearable device, and may use WiFi or wired communication with the visor) is connected to the cloud, the human input obtained for different airplanes as described above, may be used to improve the pre-trained models for segmentation so as to be more robust and adaptive to a wide range of airplane models. Note that, similar to the previous step, this step is not time-critical.

3. Real-Time Aircraft Pose Localization: There are three different frames of reference to be considered.

First, the world/global 3D frame of reference. This is the frame of reference within which the aircraft moves and flies.

Second, the aircraft/cockpit/map 3D frame of reference. This is the frame of reference within which the pilot/visor moves, and may be considered as the frame of the point cloud map that would be built to perform visor localization (step #1 above). The origin of the aircraft's frame of reference might as well be the tip of the aircraft nose, but that would essentially introduce a non-zero translation vector (at least) between the aircraft and the cockpit (i.e. map) frame of reference. Hence, the most appropriate choice of origin for this frame of reference is some arbitrarily chosen point that is visible in the point cloud of the cockpit. This can be any feature point detected as part of the corner/interest point detection algorithm used for the visual SLAM process such as FAST or ORB (c.f. [7, 8]).

When the aircraft is stationary (e.g., when the map is being built or when the training session has not yet started), the world frame of reference and the aircraft/cockpit frame of reference may be considered aligned. That is, the translation vector between the two is a null vector and there is no rotation between them. When the aircraft is in motion (either on the ground or in the air), the rotation between the two frames of reference may be measured via IMU sensors or accelerometer-gyroscope modules placed in the cockpit [6]. This relative pose between the 3D world and the aircraft frame of reference is needed, along with the relative pose of the pilot/visor with reference to the aircraft/cockpit, in order to render/augment the synthetic imagery/video on the cockpit windscreen such that it is well-registered.

Third, the trainee/visor 3D frame of reference. This is the frame of reference of the trainee pilot whose origin is essentially the optical center of one of the camera(s) mounted on the visor. Augmenting a well-registered virtual overlay in this frame of reference (as the resulting video feed is viewed by the pilot) requires that the pose of this frame of reference (i.e., translation and rotation of its origin) with respect to the cockpit/map frame of reference be computed for every incoming video frame. This problem is the subject of step #4 below. Further, the frames of reference of all other camera(s) and sensor(s) on the visor should be known with respect to the "master" camera, a process called calibration.

4. Real-Time Visor Pose Localization: At run-time, the incoming video feed from the visor and other sensory input (LiDAR and/or IMUs) need only be localized (tracked) with reference to the pre-built 3D point cloud map. Once the visor is able to localize itself in the environment i.e., the 6 DOF pose is known, the visor feed is now, in essence, well registered with the pre-built 3d map of the cockpit, and thus the windows can easily be overlaid/masked out, as desired. Note that this step is highly time critical, and needs to be done at a minimum frame rate of 60 FPS. A time delay of a single frame can potentially present a not so well registered augmentation with respect to the actual windows and windscreens, inadvertently and irreversibly giving rise to disorientation and compromising the MR ergonomics. Hence it is imperative that this step be optimized for real-time performance besides accuracy. While open source libraries such as [7, 8] exist that are able to demonstrate real-time SLAM, we propose to adapt them for our stringent application demanding fast 60 FPS localization via hardware accelerated feature extraction. Optimized hardware implementation, for instance on GPU, is all the more important as 3D synthetic imagery/video must also be rendered at high frame rate (see step [5] below). This hardware and associated software is to provide real time pose tracking on an embedded platform at high frame rate for the specific use case of IFR training (ref FIG. 1). In practice, it will also be required to perform multi-camera and camera—IMU calibration before these sensors can be used [9].

A system-level overview of the visor pose localization process is shown in FIG. 36. Incoming frames from the camera are processed with interest point detection in order to obtain reliable features to track (these are essentially 3D points on the instrument panel, and points in the cockpit in general, which can be reliably tracked from frame to frame as the camera(s) moves). A robust tracking of feature positions in the 2D frame is performed based on detected points and predicted locations from previous frame(s) via methods such as Kalman filtering, and making use of the IMU sensor. Next, the pose (6 DOF location) of the camera is obtained by optimizing the re-projection error (i.e., the error between re-projections of feature points from the map into the current camera frame, and corresponding features detected and tracked earlier) and IMU error over pose parameters. The camera pose localization problem is well studied by the visual SLAM community [1, 7, 8].

5. Pose-Aware MR Overlay: The last step in the process is the actual overlay where synthetic video feed needs to be augmented to replace the original scene visible through the cockpit windscreen or windows. Computer generated imagery/video may be developed using 3D game engines such as Unreal Engine or Unity. At run-time, the synthetic environment is rendered in real-time with the viewpoint determined in accordance with the estimated pose (steps #3 and #4 above).

As discussed above, Instrument Flight Rules (IFR) training involves flying by reference to instruments and sensors on board the plane. In this regard, the method described above can also be used to augment additional information (text/image/video) on designated areas on the instrument panel for instance in order to provide added guidance and instruction to the trainee pilot. This may involve integrating additional algorithms into the processing platform for object detection and recognition.

The following references are cited in the preceding paragraphs, and are incorporated herein by reference in their entirety. [1] G. Klein and D. Murray, "Parallel Tracking and Mapping for Small AR Workspaces," 2007 *6th IEEE and ACM International Symposium on Mixed and Augmented Reality,* 2007, pp. 225-234, doi: 10.1109/IS-MAR.2007.4538852. [2] C, Debeunne and D. Vivet. "A Review of Visual-LiDAR Fusion based Simultaneous Localization and Mapping," *Sensors* 2020, 20, 2068. https://doi.org/10.3390/s20072068. [3] G. Klein and D. Murray, "Parallel Tracking and Mapping on a camera phone," 2009 *8th IEEE International Symposium on Mixed and Augmented Reality,* 2009, pp. 83-86, doi: 10.1109/IS-MAR.2009.5336495. [4] J. Carreira and C. Sminchisescu, "CPMC: Automatic Object Segmentation Using Constrained Parametric Min-Cuts," in *IEEE Transactions on Pattern Analysis and Machine Intelligence,* vol. 34, no. 7, pp. 1312-1328, July 2012, doi: 10.1109/TPAMI.2011.231. [5] K. He, G. Gkioxari, P. Dollár and R. Girshick, "Mask R-CNN," 2017 *IEEE International Conference on Computer Vision (ICCV),* 2017, pp. 2980-2988, doi: 10.1109/ICCV.2017.322. [6] https://invensense.tdk.com/smartmotion/ [7] C. Campos, R. Elvira, J. J. G. Rodriguez, J. M. M. Montiel, J. D. Tardós, "ORB-SLAM3: An Accurate Open-Source Library for Visual, Visual-Inertial and Multi-Map SLAM", ArXiv, 2020 (https://arxiv.org/abs/2007.11898). [8] R. Mur-Artal and J. D. Tardós, "Visual-Inertial Monocular SLAM With Map Reuse," in *IEEE Robotics and Automation Letters,* vol. 2, no. 2, pp. 796-803, April 2017, doi: 10.1109/LRA.2017.2653359. [9] P. Furgale, J. Rehder, R. Siegwart, "Unified Temporal and Spatial Calibration for Multi-Sensor Systems." In Proceedings of the IEEE/RSJ International Conference on Intelligent Robots and Systems (IROS), Tokyo, Japan, 2013. https://github.com/ethz-asl/kalibr Exemplary Advantages of the Present Disclosure The present disclosure introduces material and methods for replicating instrument meteorological conditions (IMC) during flight under any actual weather conditions. By blocking and/or modifying exterior views from the cockpit in-situ, a pilot can more accurately experience the physical and psychological effects of actual IFR conditions. The present disclosure provides hardware, software, and methods for providing a mixed-reality (MR) headset that vastly improves realism compared to flight simulators and existing conventional IFR flight training hardware which consist mainly of simple blinder-type IFR hoods, visors, and goggles.

With reference to IFR pilot training as a primary application, advantages of the present disclosure include, but are not limited to, the following:

1) In-situ training—IFR pilot training is most effective when conducted during actual flight conditions where flight dynamics and associated directional forces can lead to physiological misinterpretation and disorientation. The present disclosure provides hardware that is used during actual flight thereby exposing trainees to these real-life dynamic conditions. The fully enclosed view limitation guarantees no "peeking"; the type of which frequently occurs with conventional VLDs, whether intentionally or unintentionally. It also offers instructors a high degree of control over external visibility for the pilot trainee irrespective of actual weather conditions, enabling effective replication of challenging instrument meteorological conditions (IMC) scenarios during any phase of flight.

2) Improved view control—embodiments of the present disclosure utilizes a next-generation design approach where sensors located on an MR headset are used to obstruct outside views from the cockpit to various degrees with simple adjustments to hardware sensitivity parameters such as signal gain. Furthermore, graphical replication of exterior views can be generated by an image processor to enhance awareness and reaction to such scenarios. This headset may include a single- or multi-lens camera for viewing the true external environment. Sensors fitted onto one or more locations on the headset are used to distinguish exterior from interior lighting such that built-in software can rapidly and reliably define window areas of the cockpit in three dimensions. This window area can then be blocked or altered in the user's view regardless of aircraft- or head position. Software with adaptive mapping algorithms is used to maintain definition of cockpit window positions relative to the user.

3) Enhanced setup features—embodiments of the present disclosure may additionally incorporate electromagnetic radiation sources such as infra-red (IR) emitters located inside and/or outside the aircraft in order to assist visor headset sensing of exterior and interior views of the cockpit. External lighting can change significantly during a flight due to weather changes, sun position, and aircraft orientation. These lighting dynamics may impose challenges for pattern recognition capabilities of the MR headset sensors and computing hardware. Supplementing exterior lighting with fixed and stable IR lighting can help maintain a more consistent contrast between exterior and interior regions thereby further minimizing any errors in sizing and positioning of window areas relative to the user's perspective.

4) Reduced weight and form factor—embodiments of the present disclosure provide optimized hardware and replication that reduces system size and weight compared to conventional VR headsets. An ongoing concern for VR and MR headset products has been the bulkiness and weight of the product, which contribute directly to fatigue and potential muscle strain by the user. The present disclosure describes methods that take advantage of sensor technology and software to minimize the size and weight of the hardware required by the MR headset. Hardware systems may incorporate wireless or wired data connections to a separate computing unit in order to offload weight and volume from the wearable headset, resulting in more ease and comfort for the user. This results in a product that can be used for extended durations without adding significantly to pilot fatigue.

5) Enhanced imagery—embodiments of the present disclosure may incorporate a single- or multi-lens camera(s) within the headset in order to enable external viewing along with mixed reality components to the user. A dual-lens camera provides the user with three-dimensional views of the environment upon which computer-generated imagery can be overlayed. Imagery may be of clouds, fog, rain or other objects representing instrument meteorological conditions (IMC) and/or other visual elements.

6) Simplified equipment set up—software for the MR-IFR headset of embodiments of the present disclosure is optimized to require minimal programming, initialization routines, and inputs from the user in order to establish and maintain the desired dimensional bounds defining cockpit window areas. For example, this software may reduce user inputs to a single gain slide setting that establishes boundaries for window areas over which mixed-reality elements are used to vary visibility outside said window areas. Or it may implement artificial intelligence to adapt to dynamic environmental conditions.

In sum, the MR-IFR visor invention offers a long overdue, modern upgrade to the simple molded plastic IFR hoods, visors, and goggles that continue to be used today for IFR training. Advancements in electronics miniaturization and mixed-reality (MR) software development enable a low-cost and effective means for more accurately replicating IFR conditions during training flights under any weather conditions. By ensuring full control of exterior views and real time variable transparency settings, pilot trainees can benefit from dramatically improved realism that better acquaints them with real world scenarios, thus enhancing safety while reducing costs associated with extended flight training under actual IMC. The present disclosure also provides a means for IFR pilots to maintain a high-level of proficiency when using this hardware for recurrent training as well as a means for improved skills assessment and examination.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A system for modifying a view perceived by a user who is substantially contained within an enclosure, the system comprising:
   a view-blocking wearable user visor-headset having a display surface and see-through camera;
   a distinguishing system configured to detect regions corresponding to an exterior region of the enclosure from an interior region contained within the enclosure and output a region signal, the distinguishing system is configured to generate a three-dimensional point cloud model of a substantial portion of the interior region of the enclosure;

computer memory storage and data transfer capability of the three-dimensional point cloud model;

a vision system configured to overlay imagery graphics upon the display surface of the view-blocking wearable user visor-headset based on the region signal;

first position and motion detection sensors affixable to a portion of the enclosure;

second position and motion detection sensors integrated with the view-blocking wearable user visor-headset; and hardware configured for data communication between the first position and motion detection sensors, the second position and motion detection sensors, and at least one processing unit that is configured to generate and utilize differential data between the first and the second position and motion detection sensors to reduce vision mapping compute requirements.

2. The system of claim 1, wherein the first and the second position and motion sensors include at least one of an inertial measuring unit, a gyroscopic sensor, and an accelerometer.

3. The system of claim 1, further comprising at least one electromagnetic energy emitter and at least one electromagnetic energy receiver operably coupled to a processing system.

4. A system for modifying a user's view of a region of interest from within an enclosure in which the user is present, the system comprising:

a user wearable device having a transparent display screen substantially covering a user's field of view;

a first processing unit configured to detect regions of interest and output a region signal;

second processing units configured to detect and transmit object three-dimensional orientation provided by first position and motion sensors affixed in place and second position and motion sensors integrated with the user wearable device;

a vision system configured to receive the region signal and display an image upon at least one selected region of interest;

at least one electromagnetic energy emitter and at least one electromagnetic energy receiver operably coupled to the vision system, the at least one electromagnetic energy emitter and the at least one electromagnetic energy receiver utilize infra-red electromagnetic energy; and a computer vision enabled three-dimensional point-cloud rendering subsystem configured to identify targeted regions of interest, the computer vision enabled three-dimensional point-cloud rendering subsystem comprising:

at least one camera with a focal length positioned to provide binocular three-dimensional views of a surrounding environment; and a computer-based system integrating at least one of a three-dimensional point cloud model of internal features of the enclosure in which the user is present, an inertial measurement unit (IMU), and light-detection-and-ranging (LIDAR) depth sensing filter for determining limits of the enclosure and providing environmental references for point cloud model overlay, sizing, and position.

5. The system of claim 4, wherein the transparent display screen is a Micro-Electro-Mechanical-Systems (MEMS) display utilizing holographic or diffractive extraction of light from a waveguide where at least two (2) micro-displays beam an image through a lens toward a surface of the transparent display screen.

6. The system of claim 5, wherein headset onboard inward-facing visible light emitters direct light energy towards eyes of the user.

7. The system of claim 5, wherein at least one electromagnetic energy emitter is located within an interior of the enclosure in which the user is present.

8. The system of claim 4, wherein the enclosure is an aircraft cockpit with interior regions including an instrument panel, and windowpane regions of interest providing view of exterior regions to the aircraft.

9. The system of claim 4, wherein the at least one camera is an optical see-through camera that alters between near- and far-vision by utilizing at least one of mechanical cycling of multiple sets of physical lenses and high-speed auto-focusing lenses.

10. The system of claim 4, further comprising a programmable Global Positioning System (GPS) tracking system that provides at least one of location, orientation, speed, and acceleration data to an image-generating Central-Processing-Unit (CPU).

11. The system of claim 4, further comprising inward-facing sensors or cameras utilized for at least one of gaze-tracking, eye-monitoring, and face-tracking of the user.

12. The system of claim 4, further comprising supplemental physiological measurement devices having at least one of a heart rate sensor, electroencephalogram (EEG) sensors, and Galvanic Skin Response (GSR) sensors.

13. The system of claim 4, further comprising an embedded surround sound personal audio system component to the user wearable device.

14. The system of claim 5, wherein at least one electromagnetic energy emitter is located within an exterior of the enclosure in which the user is present.

15. The system of claim 3, wherein the at least one electromagnetic energy emitter and the at least one electromagnetic energy receiver utilize infra-red electromagnetic energy.

16. A system for modifying a view perceived by a user who is substantially contained within an enclosure, the system comprising:

a view-blocking wearable user visor-headset having a display surface and see-through camera;

a distinguishing system configured to detect regions corresponding to an exterior region of the enclosure from an interior region contained within the enclosure and output a region signal;

a vision system configured to overlay imagery graphics upon the display surface of the view-blocking wearable user visor-headset based on the region signal; and a computer vision enabled three-dimensional point-cloud rendering subsystem configured to identify targeted regions of interest, the computer vision enabled three-dimensional point-cloud rendering subsystem comprising:

at least one camera with a focal length positioned to provide binocular three-dimensional views of a surrounding environment; and a computer-based system integrating at least one of a three-dimensional point cloud model of internal features of the enclosure in which the user is present, an inertial measurement unit (IMU), and light-detection-and-ranging (LIDAR) depth sensing filter for determining limits of the enclosure and providing environmental references for point cloud model overlay, sizing, and position.

17. The system of claim 16, wherein the see-through camera is configured to alter between near- and far-vision by utilizing at least one of mechanical cycling of multiple sets of physical lenses and high-speed auto-focusing lenses.

18. The system of claim 1, wherein the display surface is a Micro-Electro-Mechanical-Systems (MEMS) display utilizing holographic or diffractive extraction of light from a waveguide where at least two (2) micro-displays beam an image through a lens toward a surface of the display surface.

19. The system of claim 18, wherein inward-facing visible light emitters onboard the view-blocking wearable user visor-headset direct light energy towards eyes of the user.

20. The system of claim 3, wherein at least one electromagnetic energy emitter is located within an interior of the enclosure in which the user is present.

21. The system of claim 3, wherein at least one electromagnetic energy emitter is located within an exterior of the enclosure in which the user is present.

22. The system of claim 1, wherein the enclosure is an aircraft cockpit with interior regions including an instrument panel, and windowpane regions of interest providing view of exterior regions to the aircraft.

23. The system of claim 1, further comprising a programmable Global Positioning System (GPS) tracking system that provides at least one of location, orientation, speed, and acceleration data to an image-generating Central-Processing-Unit (CPU).

24. The system of claim 1, further comprising inward-facing sensors or cameras utilized for at least one of gaze-tracking, eye-monitoring, and face-tracking of the user.

25. The system of claim 1, further comprising supplemental physiological measurement devices having at least one of a heart rate sensor, electroencephalogram (EEG) sensors, and Galvanic Skin Response (GSR) sensors.

26. The system of claim 1, further comprising an embedded surround sound personal audio system component to the user wearable device.

27. The system of claim 16, further comprising at least one electromagnetic energy emitter and at least one electromagnetic energy receiver operably coupled to a processing system.

28. The system of claim 27, wherein the at least one electromagnetic energy emitter and the at least one electromagnetic energy receiver utilize infra-red electromagnetic energy.

29. The system of claim 27, wherein the at least one electromagnetic energy emitter is located within the interior of the enclosure in which the user is present.

30. The system of claim 27, wherein at least one electromagnetic energy emitter is located within an exterior of the enclosure in which the user is present.

31. The system of claim 1, wherein the see-through camera is configured to alter between near- and far-vision by utilizing at least one of mechanical cycling of multiple sets of physical lenses and high-speed auto-focusing lenses.

32. The system of claim 16, wherein the display surface is a Micro-Electro-Mechanical-Systems (MEMS) display utilizing holographic or diffractive extraction of light from a waveguide where at least two micro-displays beam an image through a lens toward a surface of the display surface.

33. The system of claim 32, wherein the view-blocking wearable user visor-headset comprises inward-facing visible light emitters onboard directing light energy towards eyes of the user.

34. The system of claim 16, wherein the enclosure is an aircraft cockpit having interior regions including an instrument panel and windowpane regions of interest providing view of exterior regions to the aircraft.

35. The system of claim 16, further comprising a programmable Global Positioning System (GPS) tracking system configured to provide at least one of location, orientation, speed, and acceleration data to an image-generating Central-Processing-Unit (CPU).

36. The system of claim 16, wherein the view-blocking wearable user visor-headset comprises inward-facing sensors or cameras configured for at least one of gaze-tracking, eye-monitoring, and face-tracking of the user.

37. The system of claim 16, further comprising a supplemental physiological measurement device having at least one of a heart rate sensor, electroencephalogram (EEG) sensors, and Galvanic Skin Response (GSR) sensors.

38. The system of claim 16, further comprising an embedded surround sound personal audio system component to the view-blocking wearable user visor-headset.

39. The system of claim 1 wherein the see-through camera comprises a liquid lens configured for dynamic autofocus and zoom, a system configured to adjust a lens curvature and focal length of the liquid lens via at least one of an electric field and electro-wetting mechanism.

40. The system of claim 16 wherein the see-through camera comprises a liquid lens configured for dynamic autofocus and zoom, a system configured to adjust a lens curvature and focal length of the liquid lens via at least one of an electric field and electro-wetting mechanism.

41. The system of claim 1 wherein the distinguishing system is configured to employ machine learning algorithms to detect regions corresponding to the exterior region of the enclosure from the interior region over time.

42. The system of claim 16 wherein the distinguishing system is configured to employ machine learning algorithms to detect regions corresponding to the exterior region of the enclosure from the interior region over time.

43. The system of claim 1 wherein the hardware configured for data communication is configured for use with a plurality communication protocols comprising Bluetooth, Wi-Fi, and NFC.

44. The system of claim 1 further comprising alternative peripherals configured to interface with the vision system.

45. The system of claim 4 further comprising alternative peripherals configured to interface with the vision system.

46. The system of claim 16 further comprising alternative peripherals configured to interface with the vision system'.

47. The system of claim 1 wherein the vision system is configured to automatically adapt the imagery graphics overlay based on changes in the surrounding environment.

48. The system of claim 4 wherein the vision system is configured to automatically adapt the imagery graphics overlay based on changes in the surrounding environment.

49. The system of claim 16 wherein the vision system is configured to automatically adapt the imagery graphics overlay based on changes in the surrounding environment.

50. The system of claim 1 wherein the three-dimensional point cloud model is configured to be exported in a standardized format.

51. The system of claim 4 wherein the three-dimensional point cloud model is configured to be exported in a standardized format.

52. The system of claim 16 wherein the three-dimensional point cloud model is configured to be exported in a standardized format.

53. The system of claim 1 further comprising a gesture recognition module configured to allow the user to manually define and modify regions corresponding to the exterior region or the interior region through hand or object gestures, the distinguishing system configured to detect the hand or object gesture and update the region signal.

54. The system of claim 4 further comprising a gesture recognition module configured to allow the user to manually define and modify regions corresponding to the exterior region or the interior region through hand or object gestures, the distinguishing system configured to detect the hand or object gesture and update the region signal.

55. The system of claim 16 further comprising a gesture recognition module configured to allow the user to manually define and modify regions corresponding to the exterior region or the interior region through hand or object gestures, the distinguishing system configured to detect the hand or object gesture and update the region signal.

56. The system of claim 1 wherein the distinguishing system is configured to employ artificial intelligence and machine learning algorithms.

57. The system of claim 4 wherein the distinguishing system is configured to employ artificial intelligence and machine learning algorithms.

58. The system of claim 16 wherein the distinguishing system is configured to employ artificial intelligence and machine learning algorithms.

* * * * *